US011680207B2

United States Patent
Yang et al.

(10) Patent No.: US 11,680,207 B2
(45) Date of Patent: Jun. 20, 2023

(54) DIRECT MAPPING OF LOCAL DIRECTOR FIELD OF NEMATIC LIQUID CRYSTALS AT THE NANOSCALE

(71) Applicant: The Trustees of The University of Pennsylvania, Philadelphia, PA (US)

(72) Inventors: Shu Yang, Blue Bell, PA (US); Yu Xia, Springfield, PA (US); Francesca Serra, Philadelphia, PA (US); Randall D. Kamien, Philadelphia, PA (US); Kathleen J. Stebe, Penn Valley, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/553,820

(22) PCT Filed: Feb. 18, 2016

(86) PCT No.: PCT/US2016/018366
§ 371 (c)(1),
(2) Date: Aug. 25, 2017

(87) PCT Pub. No.: WO2016/140803
PCT Pub. Date: Sep. 9, 2016

(65) Prior Publication Data
US 2018/0244995 A1    Aug. 30, 2018

Related U.S. Application Data

(60) Provisional application No. 62/127,365, filed on Mar. 3, 2015.

(51) Int. Cl.
*C09K 19/20*    (2006.01)
*C09K 19/58*    (2006.01)
(Continued)

(52) U.S. Cl.
CPC .......... *C09K 19/2007* (2013.01); *C09K 19/02* (2013.01); *C09K 19/22* (2013.01);
(Continued)

(58) Field of Classification Search
CPC ............ C09K 19/3833; C09K 19/3838; C09K 19/3842; C09K 19/3847; C09K 19/3852;
(Continued)

(56) References Cited

U.S. PATENT DOCUMENTS 6,316,066 B1 *  11/2001  Jolliffe ................... C09K 19/38
                                                    252/299.01
2001/0035520 A1 *  11/2001  Takeuchi ........... C09K 19/3086
                                                       564/176
(Continued)

FOREIGN PATENT DOCUMENTS

WO    2012/046896 A1    4/2012
WO    2014/082662 A1    6/2014

OTHER PUBLICATIONS

Dierking, Ingo, "Recent developments in polymer stabilised liquid crystals", 2010, Polymer Chemistry, 1, 1153-1159. (Year: 2010).*
(Continued)

*Primary Examiner* — Chanceity N Robinson
*Assistant Examiner* — Anna Malloy
(74) *Attorney, Agent, or Firm* — BakerHostetler

(57) ABSTRACT

Mesogenic compounds having a structure of Formula (I), (II) or (III): where A, B, X1, L, TG, m, and n are defined as in claim 1. Compositions containing these compounds, articles made from these polymerized and prepolymerized compositions, and methods of estimating the elastic constants and anchoring constants of a liquid crystal materials and mapping topological defect structures in liquid crystals using these compounds.

(Continued)

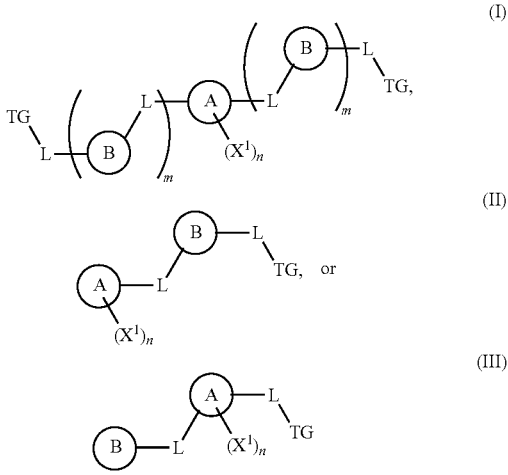

18 Claims, 14 Drawing Sheets

(51) Int. Cl.
C09K 19/02 (2006.01)
C09K 19/34 (2006.01)
C09K 19/22 (2006.01)
C09K 19/38 (2006.01)
G01N 23/2251 (2018.01)
C09K 19/04 (2006.01)
G02B 1/08 (2006.01)

(52) U.S. Cl.
CPC ...... C09K 19/3444 (2013.01); C09K 19/3833 (2013.01); C09K 19/58 (2013.01); G01N 23/2251 (2013.01); C09K 2019/0448 (2013.01); C09K 2019/2078 (2013.01); C09K 2219/00 (2013.01); G02B 1/08 (2013.01)

(58) Field of Classification Search
CPC .............. C09K 19/388; C09K 19/2007; C09K 19/3444; C09K 2019/0425; C09K 2019/0477; C09K 2019/0481; C09K 2019/0485

See application file for complete search history.

(56) References Cited

U.S. PATENT DOCUMENTS

2006/0193998 A1* 8/2006 Harding .............. G02F 1/13363 428/1.3
2007/0122688 A1 5/2007 Park et al.
2007/0246688 A1* 10/2007 Sanchez .................. B41M 3/00 252/299.01

OTHER PUBLICATIONS

Filippov et al., "Preliminary communication—The effect of a substituent in the central ring on the liquid crystalline properties of di(4-alkoxycarbonylphenyl)terephthalates", 1998, vol. 24, No. 5, 787-791. (Year: 1998).*
Rozenberg et al., "Oriented liquid crystalline network polymers", 1992, Synthesis, Characterization, and Theory of Polymeric Networks and Gels, 147-164. (Year: 1992).*
Ding, Ding-Kuo, "Structures and Dynamics of Disclinations and Inversion Walls in Nematic Polymers", https://dspace.mit.edu/handle/1721.1/33510, 1994, 1-114. (Year: 1994).*
Zuev V.V., de Vekki D. A., Catalytic isomerization of terminal olefins in liquid crystalline polyesters at hydrosilylation with 1-(1'-arylethoxy)-1,1,3,3-tetramethyldisiloxanes. Russ. J. Org. Chem., 42, 8, 1105-1112 (2006).
Zhang, Y., Lo, C.-W., Taylor, J. A. & Yang, S. Replica Molding of High-Aspect-Ratio Polymeric Nanopillar Arrays with High Fidelity. Langmuir 22, 8595 (2006).
"Waveguide", Jun. 25, 2016, Wikipedia, 3 pages, https://en.wikipeida.org/w/index.php?title=Waveguide_(optics)&oldi, Jun. 25, 2016.
Zhang C, et al., Direct observation of smectic layers in thermotropic liquid crystals. Phys. Rev. Lett. 109, 10, 107802, 5 pages, (2012).
Zasadzinski J.A., Bailey S.M. Applications of freeze-fracture replication to problems in materials and colloid science. J. Electron Microsc. Tech., 13, 4, 309-334 (1989).
Yoon, D. K. et al. Internal structure visualization and lithographic use of periodic toroidal holes in liquid crystals. Nat. Mater., 6, 5, 866-870, (2007).
Yoon DK, et al., Internal structure visualization and lithographic use of periodic toroidal holes in liquid crystals. Nat. Mater., 6, 11, 866-870 (2007).
Yelin, D., Silberberg, Y., Barad, Y. & Patel, J. S. Phase-Matched Third-Harmonic Generation in a Nematic Liquid Crystal Cell. Phys. Rev. Lett., 82, 3046 (1999).
Warenghem M., A test for surface energy anisotropy sign determination. Mol. Cryst. Liq. Cryst., 89, 1-4, 15-21 (1982).
Ware T.H., McConney M.E., Wie J. J., Tondiglia V.P., White T. J. Actuating materials. Voxelated liquid crystal elastomers. Science, 347, 6225, 982-984 (2015).
Van Oosten, C. L., Bastiaansen, C. W. M. & Broer, D. J. Printed artificial cilia from liquid-crystal network actuators modularly driven by light. Nat. Mater., 8, 677-682, (2009).
Thomsen, D. L. et al. Liquid Crystal Elastomers with Mechanical Properties of a Muscle. Macromolecules, 34, 5868-5875, (2001).
Tchernyshyov O., Chem G-W. Fractional vortices and composite domain walls in flat nanomagnets. Phys. Rev. Lett., 95, 19, 197204, 1-4, (2005).
Smalyukh, I. I., Shiyanovskii, S. V. & Lavrentovich, O. D. Three-dimensional imaging of orientational order by fluorescence confocal polarizing microscopy. Chem. Phys. Lett., 336, 88-96, (2001).
Shaw, J. M., Gelorme, J. D., LaBianca, N. C., Conley, W. E. & Holmes, S. J. Negative photoresists for optical lithography. IBM J. Res. Dev., 41,81-94, (1997).
Senyuk, B. et al. Topological colloids. Nature 493, 200-205, (2013).
PubChem-CID-15621106, Dec. 2, 2007, 9 pages.
Poulin, P., Stark, H., Lubensky, T. C. & Weitz, D. A. Novel Colloidal Interactions in Anisotropic Fluids. Science, 275, 1770-1773, (1997).
Petrov, V. F. & Shimizu, Y. Nitro substitution in achiral calamitic liquid crystals. Liquid Crystals, 28, 1627-1647, (2001).
Ohm, C., Brehmer, M. & Zentel, R. Liquid Crystalline Elastomers as Actuators and Sensors. Adv. Mater., 22, 3366-3387, (2010).
Bishop, D.J., Gammel P.L., Huse D.A., & Murray C.A. Magnetic flux-line lattices and vortices in the copper oxide superconductors. Science, 255, 5041, 165-172 (1992).
Nikkhou M., et al. Light-controlled topological charge in a nematic liquid crystal. Nat. Phys., 11, 2, 183-187 (2015).
Musevic, I., Skarabot, M., Tkalec, U., Ravnik, M. & Turner. S. Two-Dimensional Nematic Colloidal Crystals Self-Assembled by Topological Defects. Science 313, 954-958, (2006).
Modes C.D., Bhattacharya K., Warner M. Disclination-mediated thermo-optical response in nematic glass sheets. Phys. Rev. E Stat. Nonlin. Soft Matter Phys., 81, 6 Pt 1, 060701, 1-4, (2010).
Mitchell, G. R. & Windle, A. H. Structural analysis of an oriented liquid crystalline copolyester. Polymer, 23, 1269-1271, (1982).
Bouligand, Y. Twisted fibrous arrangements in biological materials and cholesteric mesophases Tissue & Cell, 4, 2, 189-217, (1972).
Livolant, F. & Bouligand, Y. Freeze-fractures in cholesteric mesophases of polymers. Mol. Cryst. Liq. Cryst., 166, 10, 91-100, (1989).
Lee, J. Y., Jang, J., Hong, S. M., Hwang, S. S. & Kim, K. U. Relationship between the structure of the bridging group and curing of liquid crystalline epoxy resins Polymer, 40, 3197-3202, (1999).
Lapointe, C. P., Mason, T. G. & Smalyukh, I. I. Shape-Controlled Colloidal Interactions in Nematic Liquid Crystals. Science 326, 1083-1086, (2009).

(56) References Cited

OTHER PUBLICATIONS

Kupfer, J. & Finkelmann, H. Nematic liquid single crystal elastomers. Makromol. Chem. Rapid Comm., 12, 717-726, (1991).
Kibble T.W.B., Topology of cosmic domains and strings. J. Phys. Math. Gen., 9, 8, 1387-1398, (1976).
Kachynski, A. V., Kuzmin, A. N., Prasad, P. N. & Smalyukh, I. I. Coherent anti-Stokes Raman scattering polarized microscopy of three-dimensional director structures in liquid crystals. Appl. Phys. Lett., 91, 151905, 1-3, (2007).
Jahromi, S., Lub, J. & Mol, G. N. Synthesis and photoinitiated polymerization of liquid crystalline diepoxides. Polymer, 35, 622-629, (1994).
Ito, H. Chemical amplification resists: history and development within IBM. IBM J. Res. Dev., 41, 69, 119-130, (1997).
Hudson, S. D. & Thomas, E. L. Frank Elastic-constant anisotropy measured from transmission electron microscope images of disclinations. Phys. Rev. Lett., 62, 5, 1993-1996, (1989).
Higgins, D. A. & Luther, B. J. Watching molecules reorient in liquid crystal droplets with multiphoton-excited fluorescence microscopy. J. Chem. Phys., 119, 3935-3942, (2003).
Gao, M. et al. Direct observation of liquid crystals using cryo-TEM: specimen preparation and low-dose imaging. Microscopy Res. and Technique, 77, 19, 754-772, (2014).
Feller, M. B., Chen, W. & Shen, Y. R. Investigation of surface-induced alignment of liquid-crystal molecules by optical second-harmonic generation. Phys. Rev. A, 43, 6778-6792, (1991).
Faetti, S. The effects of curvature on nematic liquid crystals confined in a cylindrical cavity. Phys. Lett. A, 237, 264-270, (1998).
Donald, A. M., Viney, C. & Windle, A. H. Banded structures in oriented thermotropic polymers. Polymer, 24, 155-159, (1983).
Dierking, I. Recent developments in polymer stabilised liquid crystals. Polym. Chem., 1, 1153-1159, (2010).
Dierking, I. & Archer, P. Imaging liquid crystal defects. RSC Adv., 3, 5, 26433-26437, (2013).
Dewar, M. J. S. & Goldberg, R. S. Effects of central and terminal groups on nematic mesophase stability. J. Org. Chem., 35, 2711-2715, (1970).
Del Campo, A. & Greiner, C. SU-8: a photoresist for high-aspect-ratio and 3D submicron lithography. J. Micromech. Microeng., 17, R81-R95, (2007).
Crawford, G. P., Allender, D. W. & Doane, J. W. Surface elastic and molecular anchoring properties of nematic liquid crystals confined to cylindrical cavities. Phys. Rev. A, 45, 8693-8708, (1992).
Cavallaro, M. et al. Exploiting imperfections in the bulk to direct assembly of surface colloids. Proc. Nat. Acad. Sci. U. S. A., 110, 18804-18808, (2013).
Broer, D. J., Lub, J. & Mol, G. N. Synthesis and photopolymerization of a liquid crystalline diepoxide. Macromolecules, 26, 1244-1247, (1993).
Broer, D. J., Bastiaansen, C. M. W., Debije, M. G. & Schenning, A. P. H. J. Functional Organic Materials Based on Polymerized Liquid-Crystal Monomers: Supramolecular Hydrogen-Bonded Systems. Angew. Chem. Int. Ed., 51, 7102-7109, (2012).
PubChem-CID-15621105, create date: Dec. 2, 2007, p. 3.
Berreman et al, Theory and Simulation of freeze-fracture in Cholesteric Liquid Crystals, PhysRev Lett, vol. 57, Oct. 6, 1986.
Klaus et al, SiO2 Chemical Vapor Deposition at Room Temperature Using SiCl4 and H2O with an NH3 Catalyst, J. Electrochem. Soc 147(7) 2658-2664 (2000).
Yu et al., Directed bending of a polymer film by light, Nature vol. 25, Sep. 11, 2003.

* cited by examiner

LCM_X1

LCM_X2

LCM_X3

FIG. 5A
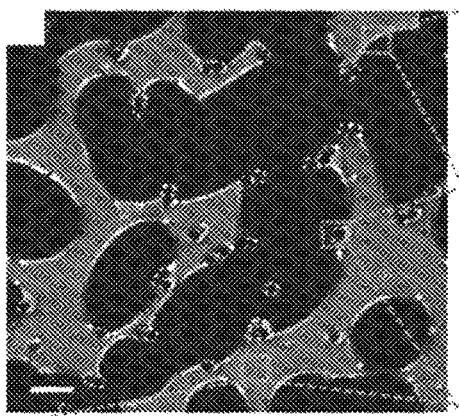
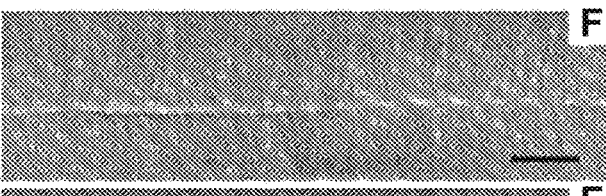
FIG. 5B
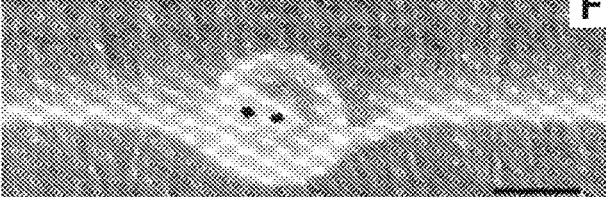
FIG. 5C
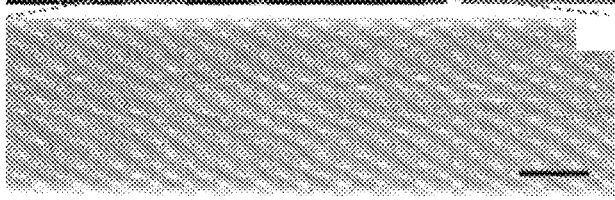
FIG. 5D
FIG. 5E FIG. 9A
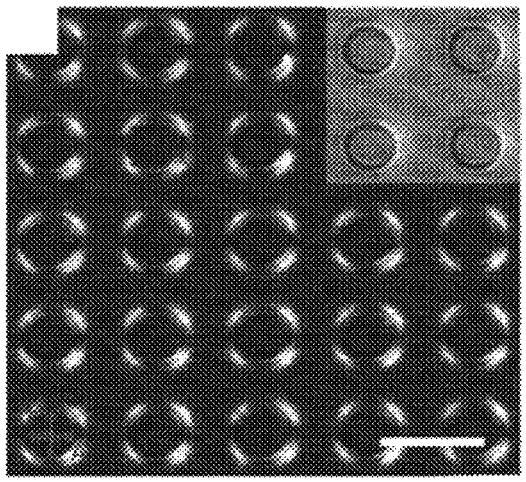
FIG. 9B
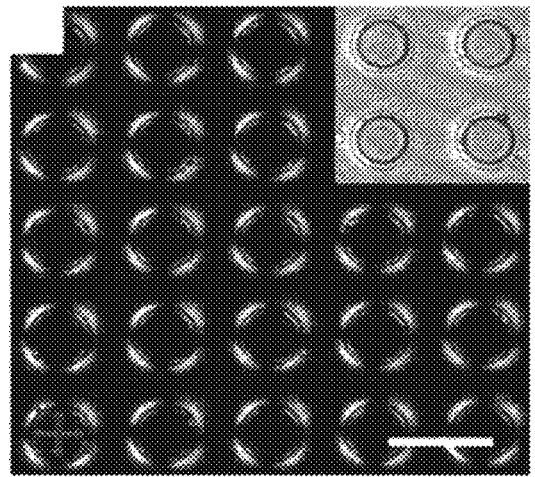
FIG. 9C
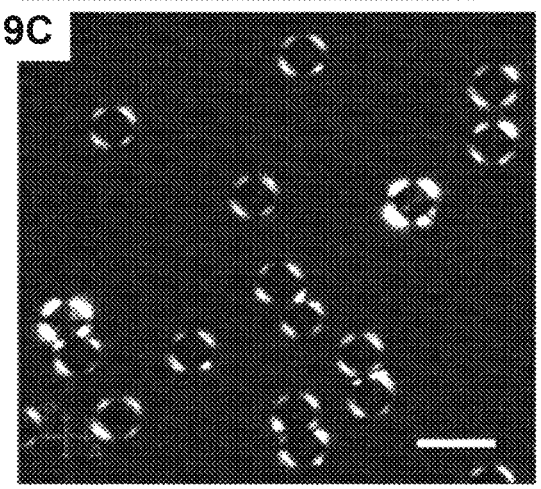
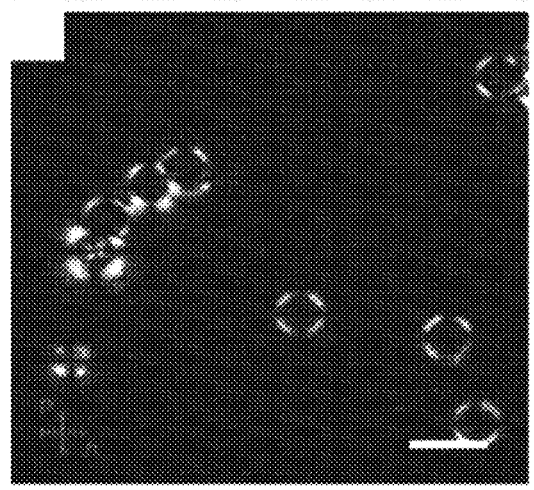
FIG. 9D FIG. 10A
FIG. 10B
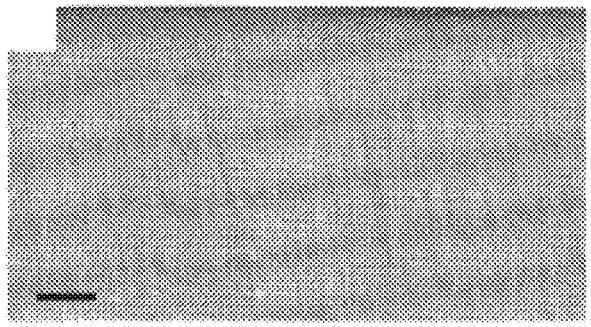
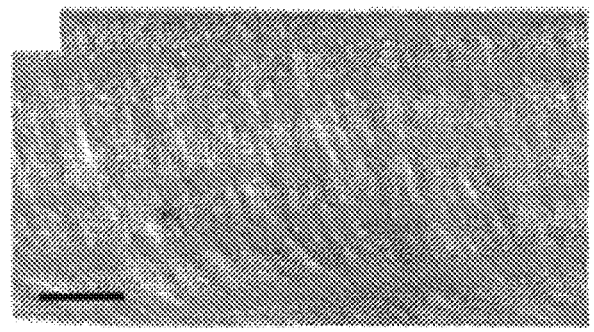
FIG. 11
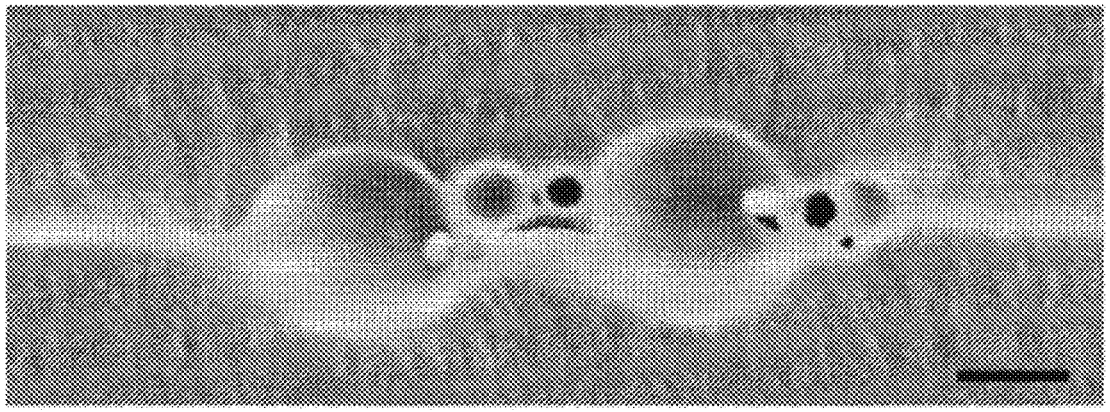

FIG. 12A
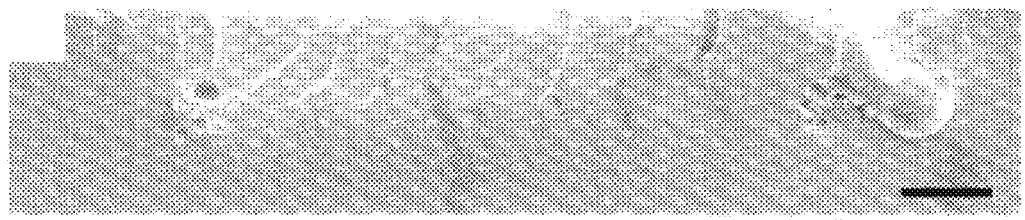
FIG. 12B
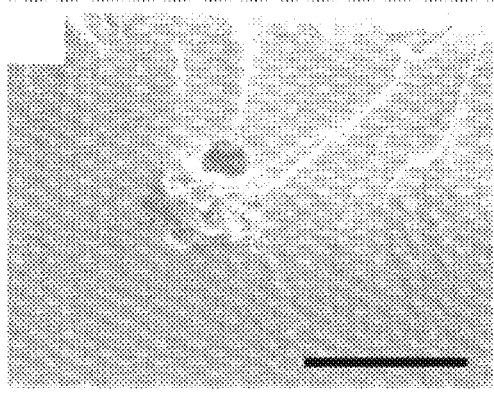
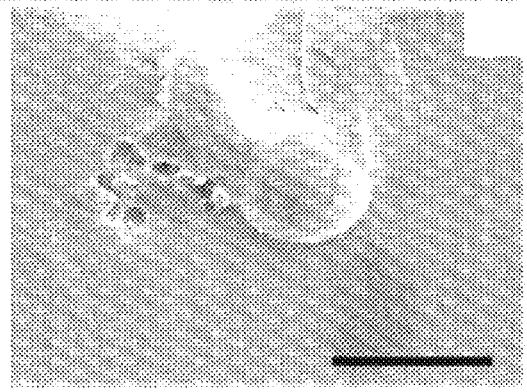
FIG. 12C

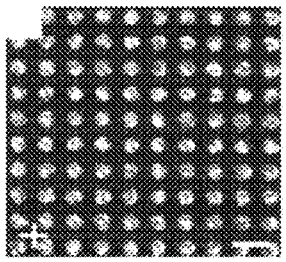 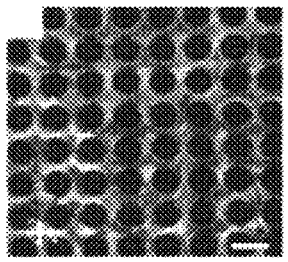 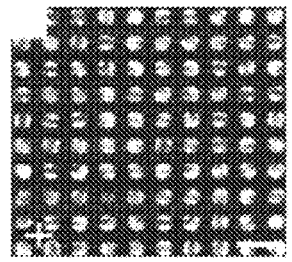 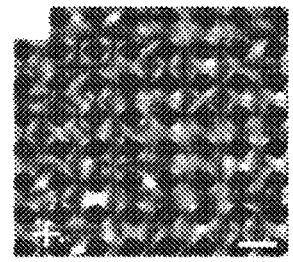
FIG. 13A  FIG. 13B  FIG. 13C  FIG. 13D
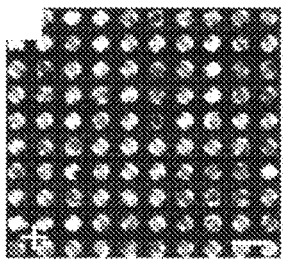 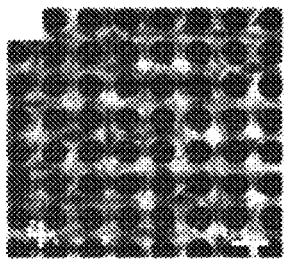 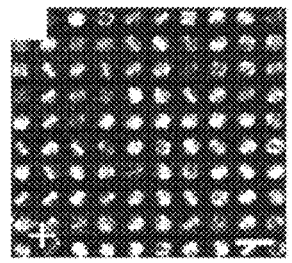 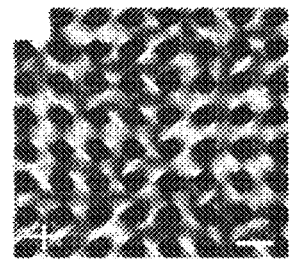
FIG. 13E  FIG. 13F  FIG. 13G  FIG. 13H
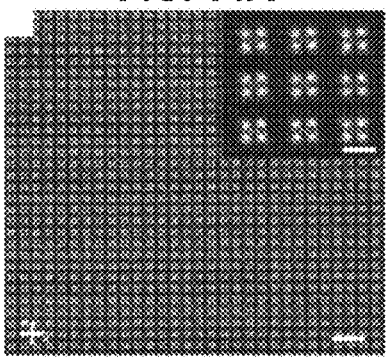 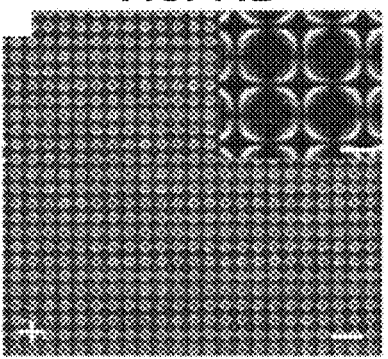 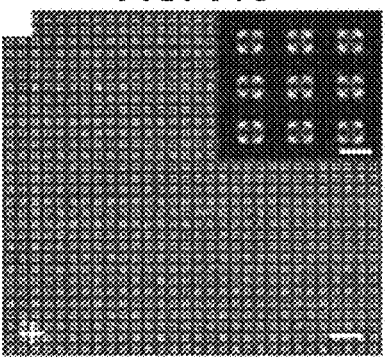
FIG. 14A  FIG. 14B  FIG. 14C FIG. 15
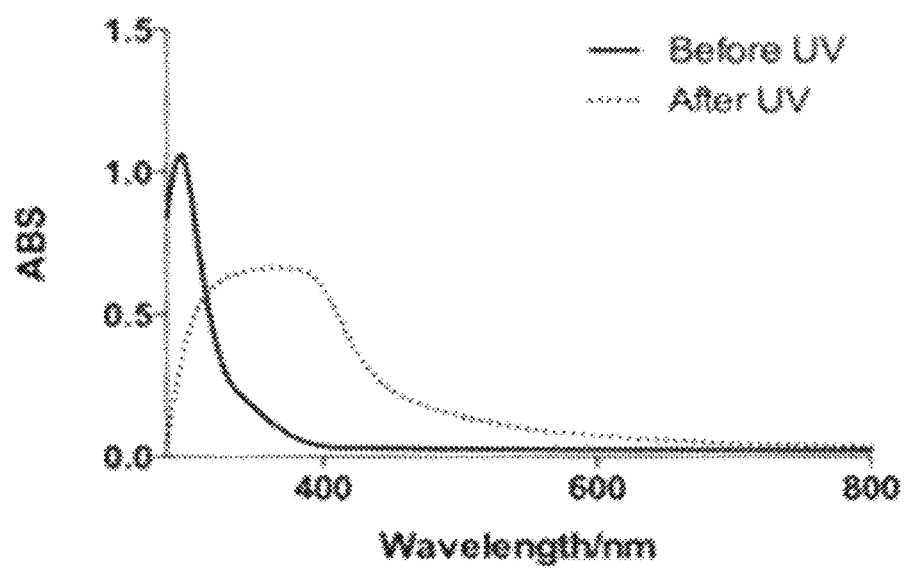
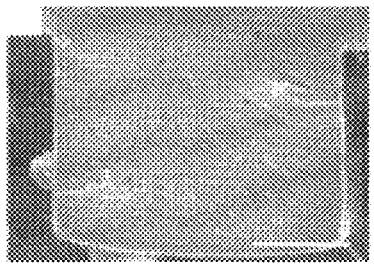
FIG. 16A
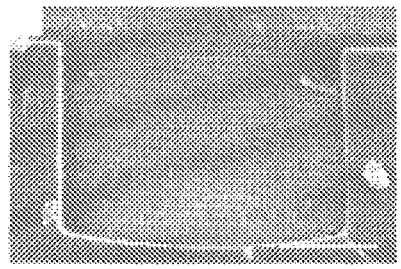
FIG. 16B
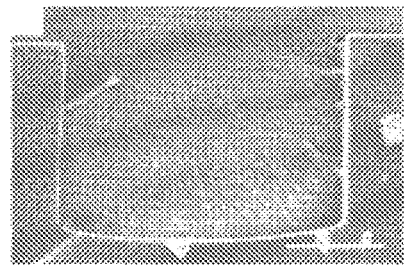
FIG. 16C

DIRECT MAPPING OF LOCAL DIRECTOR FIELD OF NEMATIC LIQUID CRYSTALS AT THE NANOSCALE

CROSS-REFERENCE TO RELATED APPLICATIONS

This application is the National Stage Application of International Patent Application No. PCT/US2016/018366 filed Feb. 18, 2016, which claims the benefit of U.S. Patent Application No. 62/127,365, filed Mar. 3, 2015, the entire contents of which are incorporated by reference herein in their entirety.

STATEMENT REGARDING FEDERALLY SPONSORED RESEARCH OR DEVELOPMENT

This invention was made with government support under Contract Nos. DMR-1120901, DMR-1410253, and DMR12-62047 awarded by the National Science Foundation. The government has certain rights in the invention.

TECHNICAL FIELD

The present disclosure is directed to liquid crystal compositions and methods of making and using the same.

BACKGROUND

Liquid crystals (LCs) are the original nanomaterial. The manipulation of these nanometer-size molecules into coherent, centimeter-scale structures is now routine. Though we have become adept at deducing textures indirectly through optical microscopies, probing the molecular-scale organization requires either a glassy material or rapid cooling of samples to obtain metastable states that can be directly visualized through Scanning Electron Microscopy (SEM), Transmission Electron Microscopy (TEM), and Atomic Force Microscopy (AFM). Although these techniques are effective for the study of a variety of LC phases including smectic LCs, cholesteric and blue phases, and biological LC polymers, non-glassy, low molecular weight nematic LCs (NLCs) reorient during fast freezing. Polymer nematics can be quenched into metastable states but organization of static configurations through surface alignment is difficult. In those systems, flow alignment can be employed but that often precludes complex, molecular scale patterning of the boundary conditions, essential for controlling and manipulating topological defects. Visualization of topological defects can be achieved by dispersing polymer fibers in a pre-aligned, low-molecular weight NLC. However, the polymer fibers, fabricated in situ via polymerization of LCMs, often phase separate from the nematic host; thus maintaining the LC director field in the nonglossy nematic host for direct visualization is thwarted. Moreover, the fibers themselves could perturb the nematic phase inducing defects and artifacts.

New methods and liquid crystal additives are needed to explore these effects.

SUMMARY

The present disclosure is directed to mesogenic compounds having a structure of any one of Formula (I), (II), or (III):

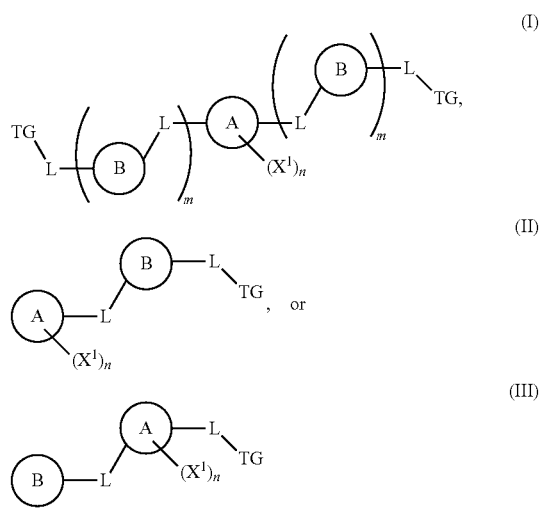

wherein:

ring A and ring B are independently a 5-12 membered aromatic or heteroaromatic ring structure containing 1, 2, or 3 O, S, or N atoms in the ring structure;

L is a linking group comprising a dipolar group;

$X^1$ is $NO_2$, CN, Br, Cl, F, or $OCH_3$;

TG comprises an optionally chiral epoxy, glycidyl, acrylate, methacrylate, alkene, alkyne, oxetane, or other polymerizable group;

m is independently 1, 2, or 3 at each occurrence; and n is independently 1, 2, or 3.

In certain of these embodiments, A and B are independently phenyl or pyridinyl.

In some embodiments, L is independently at each occurrence —C(O)—, —CH(C=NOH)—, —C(O)O—, —OC(O)—, —C(O)N($R^1$)—, —N($R^1$)—C(O)—, —OC(O)O—, —OC(O)N($R^1$)—, —N($R_1$)C(O)O—, —S(O)—, —$SO_2$—, —CH(OH)—, or —C(OH)$_2$—; and $R^1$ is independently at each occurrence H or $C_{1-3}$alkyl. In certain embodiments, L is the same —C(O)O— or —OC(O)— at each occurrence.

In some embodiments, n is 1. In further embodiments, n is 1 and L is nitro. Additionally, TG may independently comprise an epoxy or an achiral or chiral glycidyl.

In further embodiments, TG may be an alkene.

In other embodiments, m is 1.

In some embodiments, the mesogenic compound is LCM_X1, LCM_X2, LCM_X3, or combinations thereof:

LCM_X1

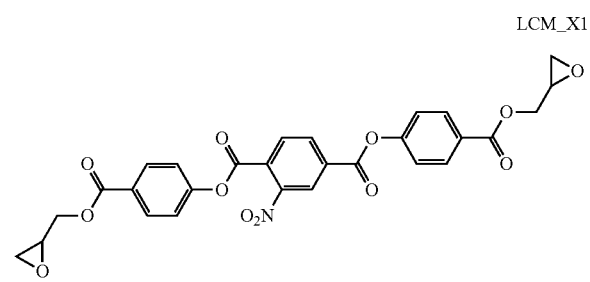

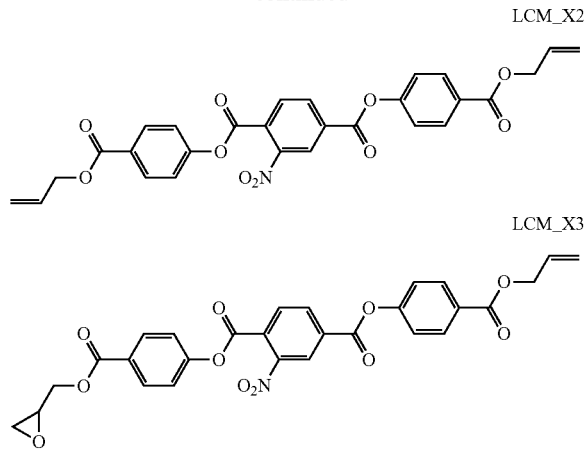

The disclosure also contemplates compositions where these mesogenic compounds are incorporated into compositions, in the presence or absence of at least one multifunctional crosslinking agent, or into polymerized compositions in which the mesogenic compound has been crosslinked with or without at least one such multifunctional crosslinking agent. These polymerized or unpolymerized compositions may comprise dopants.

Still further, the disclosure includes those embodiments in which the compounds or compositions are superposed on a nano- and micro-dimensionally patterned substrate, or a substrate deposited with micro- or nanoparticles. In other embodiments, the compositions, particularly the polymerized compositions, may be free standing.

Such compositions may be incorporated into articles such as optical films, coatings, encapsulants, optical waveguides, actuators, sensors, artificial muscles, mechanically or thermally tunable laser devices or temperature sensors, optical polarizers, photovoltaic substrates and fuel cell membranes. Such articles are considered within the scope of this disclosure.

Such compositions may also be used in methods of estimating the elastic constants and anchoring constants of a liquid crystal materials and mapping topological defect structures in liquid crystals. Information obtained from these methods may be used to develop electronic materials with high temperature stability and tailored isotropic coefficient of thermal expansion (CTE), dielectric constant (k), and loss tangent (tan δ) and structural materials with high strength vs. weight ratio. Accordingly, such electronic and structural materials are also considered within the scope of this invention.

Two of the many advantages of these inventive compositions are that they provide excellent surface anchoring characteristics and a significantly broader temperature window for the liquid crystal phase than do current materials. Obtaining higher and lower temperature materials is one of the technical driving forces in the industry. Another advantage is that the materials are less expensive to produce than those in current use, while maintaining processability which is consistent with current LC manufacturing processes.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 5A-5E show metastable configurations. (5A) POM image of silica colloids suspended in LCM resulting in coexistence of homeotropic and planar-like regions, where the metastable planar regions are stabilized by silica colloids. (5B, 5C, 5E) SEM images characterizing the local director field at different positions in (5A) as indicated by the dotted squares. (5B) SEM image taken at the boundary between homeotropic and planar regions of LC, where a bright line in the middle of the image is shown, indicating the presence of a line defect. (5C) SEM image of a silica colloid sitting at the boundary. The bright line in the image shows a line defect in the bulk of LC that merged with the Saturn ring defect encircling the colloid. The silica colloid was trapped in the middle height of the LC cell, and slightly sank downwards. (5D) SEM image of fiber-like structure that shows a bulk line defect pinned to the bottom surface, as indicated by the bending white line. (5E) SEM image of local LC director field inside an "escaped in the third dimension" region. Horizontally aligned fiber-like fractures indicating planar alignment of LC director field were found in the middle of the image, where the bending fiber-like fractures from top and bottom boundaries merged. Scale bars: (5A): 20 µm; (5B-5E): 3 µm.

FIGS. 9A-9D show maintenance of LC director field during photopolymerization. (9A-9B) POM images of LCM_X1 and its polymer in pillar arrays (diameter: 10 µm, pitch: 20 µm, height: 9 µm) with homeotropic anchoring imposed at all surfaces before (9A) and after (9B) UV curing. Insets in (9A & 9B): BF images show possible bulk line defects. (9C-9D) POM images of silica colloids dispersed in LCM_X1 with homeotropic anchoring at all surfaces before (9C) and after (9D) UV curing. Scale bars: 9A-9B: 20 µm; 9C-9D: 10 µm.

FIGS. 10A and 10B show SEM images of fracture structures of liquid crystal polymers (LCPs) in a 1D microchannel. (10A) A homeotropic cell. (10B) A hybrid cell with homeotropic anchoring on the top, and uniform planar anchoring at the bottom (on a rubbed polyimide). Scale bars: 2 µm.

FIG. 11 shows merging of line defects. SEM image of bulk disclination stabilized by multiple colloids. Scale bar: 2 µm.

FIGS. 12A-12C show escaping behavior of LCs in a planar-like region. SEM images of LCP inside a planar region in a homeotropic LC cell. (12A) The fracture structure shows stabilization of disclination lines with silica colloids sitting at the two ends of the planar region, and the escaping behavior of LC director from right to left. (12B-12C) A close look at the director field surrounding the colloid. Scale bars: 5 µm.

FIGS. 13A-13H provide POM images of LCM_AZO [4-ethoxy-4'-(6-acryloyloxyhexyloxy) azobenzene] and RM257 [(1,4-bis-[4-(6-acryloyloxyhexyloxy)benzoyloxy]-2-methylbenzene)] on various patterned epoxy substrates coated with different surface chemistry. (13A) LCM_AZO in polyvinyl alcohol (PVA) coated square array of pores. (13B) LCM_AZO between PVA coated square array of pillars. (13C) LCM_AZO in dimethyloctadecyl[3-(trimethoxysilyl)propyl]ammonium chloride (DMOAP) coated square array of pores. (13D) LCM_AZO between DMOAP coated square array of pillars. (13E) RM257 in PVA coated square array of pores. (13F) RM257 between PVA coated square array of pillars. (13G) RM257 in DMOAP coated square array of pores. (13H) RM257 between DMOAP coated square array of pillars. Scale bar applied to all figures: 20 µm. Pores in 13A, 13C, 13E, and 13G: diameter: 10 µm, pitch: 15 µm, depth: 20 in. Pillar arrays in 13B, 13D, 13F, and 13H: diameter: 10 µm, pitch: 20 m, height: 19 µm. Samples were cooled slowly (1° C./min) from isotropic phase (100° C. for LCM_AZO and 130° C. for RM257) to nematic phase (94° C. for LCM_AZO and 125° C. for RM257).

FIGS. 14A-14C are POM images of various LCMs on patterned substrates with homeotropic anchoring at the boundaries. (14A) LCM_X2 in the square array of pores. (14B) LCM_X2 between the square array of pillars. (14C) LCM_X3 in the square array of pores. Scale bars: 40 in. Insets: POM images with higher magnification. Scale bars: 10 µm. Pores in (14A & 14C): diameter: 10 µm, pitch: 15 µm, depth: 20 µm. Pillar arrays in (14B): diameter: 10 µm, pitch: 20 µm, height: 19 µm. Samples were fast cooled (~20° C./min) from isotropic phase (LCM_X2, 110° C.; LCM_X3, 85° C.) to nematic phase (LCM_X2, 90° C.; LCM_X3, 70° C.).

FIG. 15 is a UV-Vis spectrum of LCM_X1 before and after UV curing. The slight change in color can be attributed to the difference in UV-vis absorption of monomer vs. polymer. After polymerization, LCM_X1 appears somewhat yellowish.

FIGS. 16A-16C shows SEM images of LCP in a channel. Images were taken from three different positions in the sample. Scale bars: 10 µm.

DETAILED DESCRIPTION OF ILLUSTRATIVE EMBODIMENTS

Figure 1A:
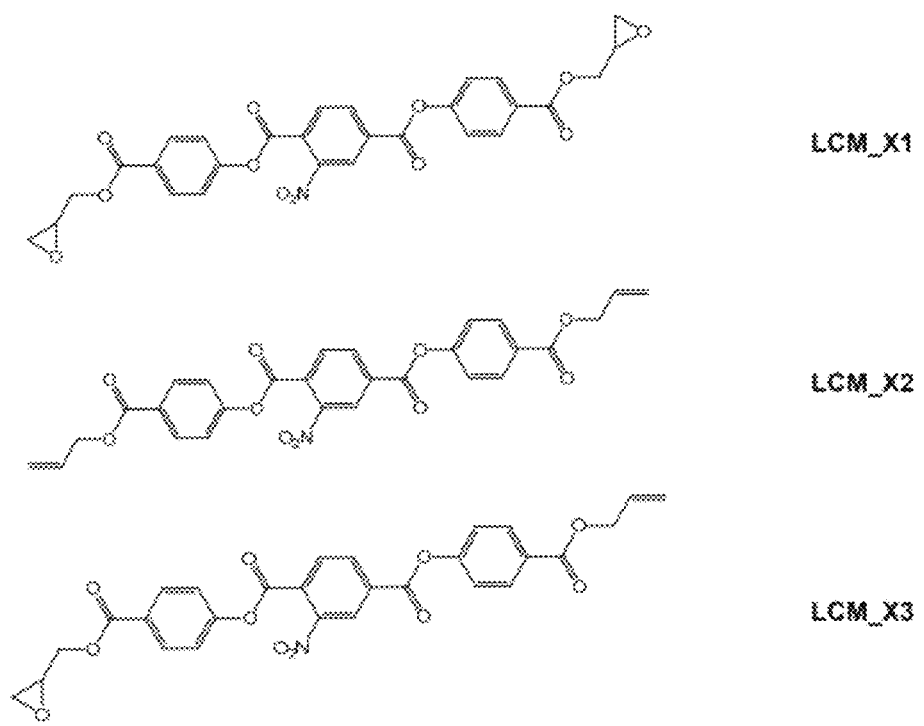
FIGS. 1A-1B show schematic illustrations of the chemical structures of LCM_X1, LCM_X2, or LCM_X3 (1A) and random intermolecular dipole-dipole interactions between nitro and carbonyl groups (1B).

The present disclosure is directed to compounds which allow, for the first time, the direct, real-space mapping of the nematic director with 100 nm accuracy on complex topographies, including patterned substrates, topological point and line defects, and various metastable states created by colloids suspended in NLC, by using a specially designed crosslinkable liquid crystal monomer (LCM) with strong dipole-dipole interactions. Upon polymerization, the optical signature does not change and the resulting liquid crystal polymer (LCP) can be characterized under SEM.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) is the ability of the mesogenic compound to form nematic liquid crystals which can be visualized at the nanoscale.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

The present disclosure is directed to mesogenic compounds having a structure of any one of Formula (I), (II), or (III):

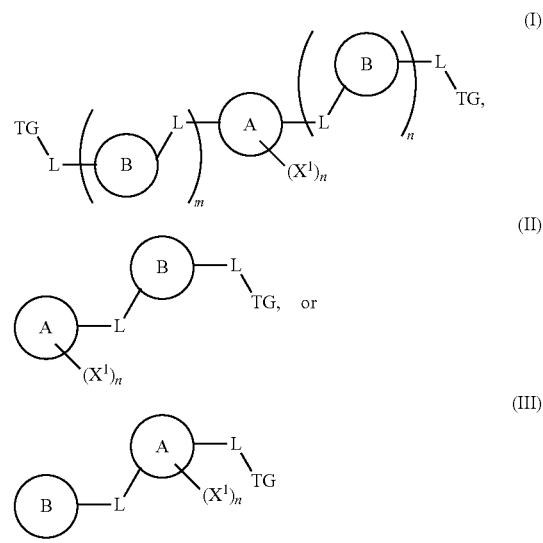

where ring A and ring B are independently a 5-12 membered aromatic or heteroaromatic ring structure containing 1, 2, or 3 O, S, or N atoms in the ring structure;

L is a linking group comprising a dipolar group;

$X^1$ is $NO_2$, CN, Br, Cl, F, or $OCH_3$;

TG comprises an optionally chiral epoxy, glycidyl, acrylate, methacrylate, alkene, alkyne, oxetane, or other polymerizable group;

m is independently 1, 2, or 3 at each occurrence; and n is independently 1, 2, or 3.

As used herein, the term "mesogenic" is used in its accepted meaning and refers to a rod-like structure composed of two or more aromatic and/or aliphatic rings connected in one direction, such as shown in Formula I & II.

Ring A and ring B are independently a 5-12 membered aromatic or heteroaromatic ring structure containing 1, 2, or 3 O, S, or N atoms in the ring structure. Non-limiting examples of such structures include furanyl, bifuranyl, thiophenyl, bithiophenyl, pyrrolyl, bipyrrolyl, phenyl, biphenyl, pyridinyl, bipyridinyl, naphthyl, quinolinyl, isoquinolinyl, benzothiophenyl, benzofuranyl, indole, or benzoimidazole. This definition of aromatic or heteroaromatic ring structure is intended to include fused and non-fused aromatic or heteroaromatic ring structures, including, for example, the following structures and their isomers:

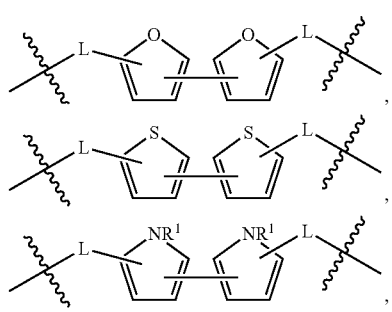

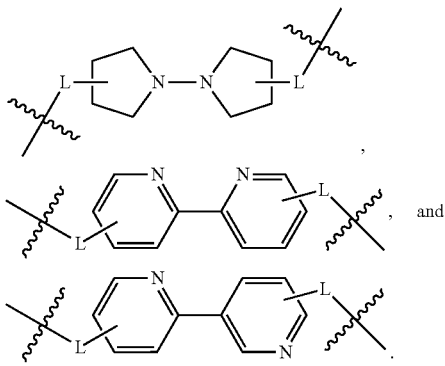

, and

In certain independent embodiments, A is phenyl or pyridinyl. In others, B is independently phenyl or pyridinyl at each occurrence. In certain embodiments, A is phenyl and B is pyridinyl at each occurrence or A is pyridinyl and B is phenyl at each occurrence. Additionally, A and B may be phenyl at every occurrence.

Each A and B ring is attached to two linking groups L, which may be positioned on any ring position relative to one another. For example, in 5-membered heteroaromatics, such as furanyl, thiophenyl, or optionally alkylated pyrrolyl, each of the two L groups may be positioned at the 2,3-positions, the 2,4 positions, the 2,5 positions, or the 3,4 positions; e.g., where Z is O, S, NH, or N-alkyl:

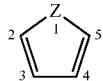

For 6-membered aromatic or heteroaromatic rings, the two L groups may be attached or positioned in the ortho, meta, or para-positions, relative to each other, each positioning being the same or different on each A and B ring. In certain specific embodiments, where each L is positioned para to one another on each A or B ring, the para-positioning provides maximum linearity of the structure. In other embodiments, though, one or more rings may comprise relative meta positioning of the L groups, in which case the resulting liquid crystal is called bent-core liquid crystal molecules.

Exemplary, non-limiting examples of para positioning for phenyl or pyridinyl rings include the following structures:

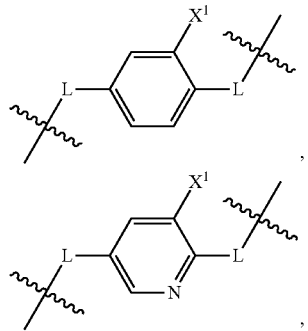

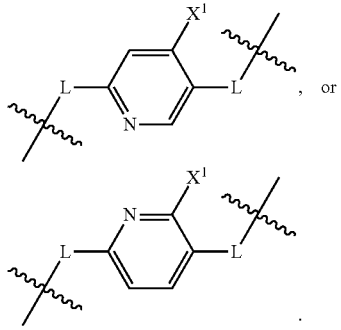

, or

In certain embodiments, the mesogenic compound of claim 1, wherein one or both of A and B are independently naphthyl, quinolinyl, isoquinolinyl, benzothiophenyl, benzofuranyl, indole, or benzoimidazole. For such 9- and 10-membered aromatics or heteroaromatics, such as naphthyl, quinolinyl, or isoquinolinyl, each of the two L groups may be positioned at any two available positions on the ring. In some embodiments, the L groups are positioned to be maximally distanced from each other, for example in the 2,6 or 3,7 positions here, or the 2,7 or 3,6 positions. Specific placement of the L groups may depend on the position of any heteroatom incorporated into the ring system.

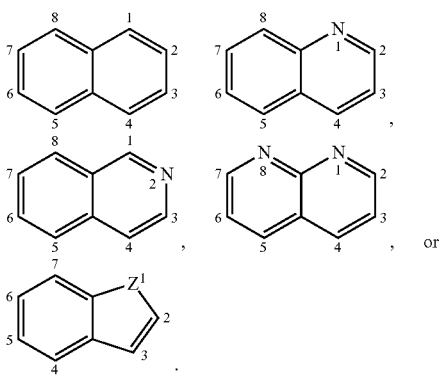

, or

Exemplary, non-limiting placements of L on certain 10-membered rings include

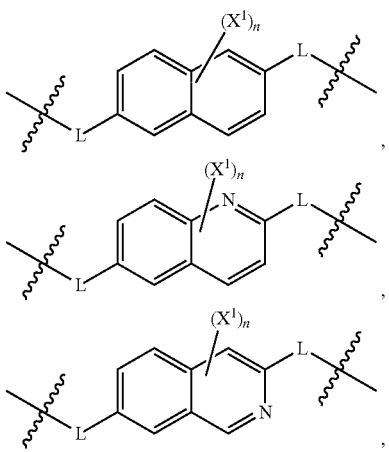

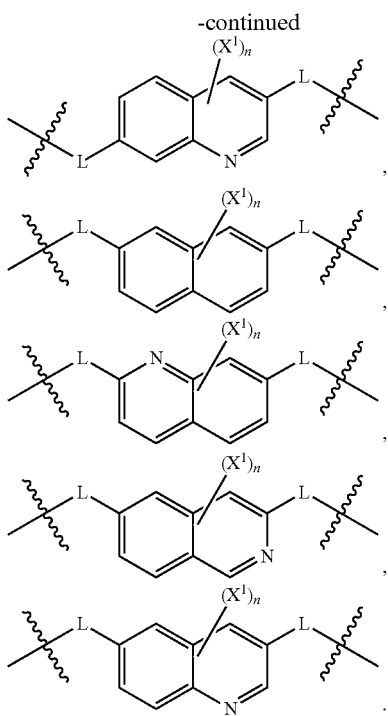

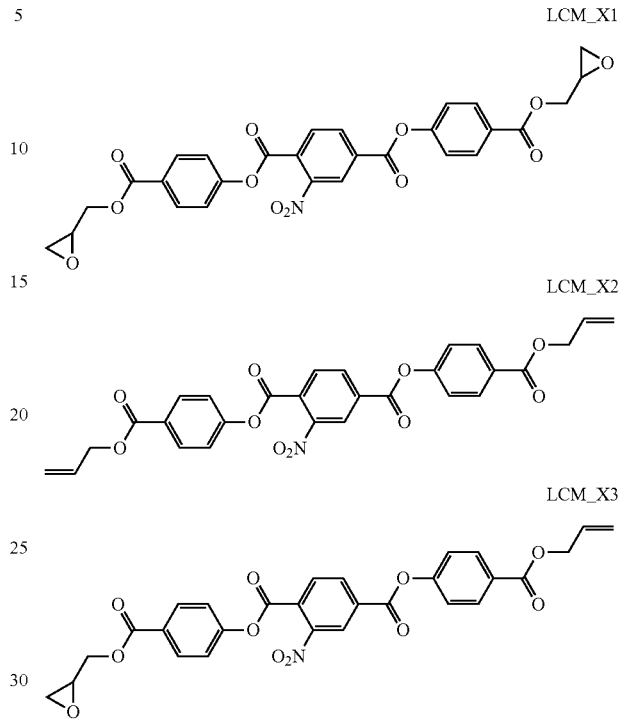

To this point, L is described in terms of L a linking group comprising a dipolar group such as carbonyl, sulfoxide, or sulphone moieties. Such linking groups include those having extrinsic dipole character and include groups such as —C(O)—, —CH(C=NOH)—, —C(O)O—, —OC(O)—, —C(O)N(R¹)—, —N(R¹)—C(O)—, —OC(O)O—, —OC(O)N(R¹)—, —N(R₁)C(O)O—, —S(O)—, —SO₂—, —CH(OH)—, or —C(OH)₂—; and R¹ is independently at each occurrence H or $C_{1-3}$alkyl. Such L groups may be the same or different at each occurrence. In some embodiments, L is independently at each occurrence —C(O)O—, —OC(O)—, —C(O)NH—, —NH—C(O)—, —C(O)N(CH₃)—, or —N(CH₃)—C(O)—. In other embodiments, L is the same —C(O)O— or —OC(O)— at each occurrence.

As described above, X¹ also comprises a dipolar substituent. In some embodiments, the dipolar character of X¹ is greater than is that of L. In certain embodiments, X¹ is NO₂, CN, Br, Cl, F, or OCH₃. In other embodiments, X¹ is nitro. The number of such X¹ substituents depends on the number of available positions in the A-ring, considering the attachment of the two L groups. In some embodiments, n is 1.

Also as described above, TG independent comprises an optionally chiral epoxy, glycidyl, acrylate, methacrylate, alkene, alkyne, oxetane, or other polymerizable group at each occurrence. Generally, both TG groups may be the same moiety or mixture of moieties. In some embodiments, for reasons described elsewhere herein, TG independently comprises an epoxy or glycidyl. In certain of embodiments, one or both of TG is chiral, for example comprising an R-glycidyl or S-glycidyl moiety. Such chiral molecules may be present as chiral or racemic mixtures within the composition.

There is no intrinsic limit to the molecular length of the compounds of Formula I (as defined by m), though in practical terms, m is 1 or 2 and the same at each occurrence. In some embodiments, m is 1. In other embodiments, A ring is positioned as nearly as possible central within the mesogenic structure (i.e., m is the same at each occurrence). In further embodiments, n is 1.

In some embodiments described herein, the mesogenic compound is:

In addition to the compounds described herein, the disclosure also includes those compositions comprising such compounds. Certain embodiments, then, include those compositions comprising any one of the mesogenic compounds described here and a crosslinking agent. Such crosslinking agents are known in the art and include polyfunctional compounds containing two OH, N(R₁)₂ [where R¹ is H or $C_{1-3}$ alkyl], COOH, or SH. In some embodiments, the crosslinking agents include polyfunctional compounds containing three or more OH, N(R₁)₂ [where R¹ is H or $C_{1-3}$ alkyl], COOH, or SH. Exemplary compounds of this type include polyols, polyamines, aminopolyols, hydroxypolyamines, di- or polycarboxylic acids, polyhydroxycarboxylic acids, or a combination thereof. The terms polyol, polyamine, polythiol, and polycarboxy acids are meant to connote those compounds having at least two hydroxy, amino, thiol, or carboxylic acid groups, respectively. In some embodiments, the polyol, polyamine, polythiol, and polycarboxy acids connote compounds having at least three hydroxy, amino, thiol, or carboxylic acid groups, respectively. Similarly, an aminopolyol is a polyol having at least one amino and a hydroxypolyamine is a polyamine with at least one hydroxy. Exemplary polyols include glycol and polyglycols, glycerol, trimethylol propane, and pentaerythritol. Functionalized polythiols include 1,6-hexanedithiol, 1,8-octanedithiol, 1,10-decanedithiol and other multi-functional acids or multifunctional thiols, such as pentaerythritol tetrakis(3-mercaptopropionate). Such polythiols may also be used in combination with multi-functional alkenes, such as 1,3,5-trivinyl-1,3,5-trimethylcyclotrisiloxane and 1,3,5,7-tetravinyl-1,3,5,7-tetramethylcyclotetrasiloxane.

Other embodiments of compositions comprising any one of the mesogenic compounds described here and a crosslinking agent, include those where the crosslinking is a photoacid generator. Such photoacid generators are used in chemical amplification as are known in the art. Non-limiting examples of these types of catalysts include perfluoro alkanesulfonate or diphenyl-iodonium 9,10-dimethylanthracene-2-sulfonate (DIAS), ($\eta^5$-2,4-cyclopentadiene-1-yl)[1,2,3,4,5,6-q](1-(methylethyl)benzene)iron(I) hexafluorophosphate (Irgacure 261, Ciba Specialty Chemicals) and cyclopentadienyl(fluorene) iron(II) hexafluorophosphate (Aldrich) for UV and visible wavelength, triarylsulfonium hexafluoroantimonate salts (Aldrich) for UV light. Other photoinitiator used in free radical polymerization are known in the art, for example, from Ciba Specialty Chemicals: Irgacure 184, 651, 819, 2959, TPO (for UV light), and 784 (for UV and visible) and from Aldrich: 2,2-Dimethoxy-2-phenylacetophenone (for UV).

In still other embodiments, the compositions may comprise or further comprise at least one molecular or nanodimensioned dopant. Such molecular dopants may also include chiral dopants including ZLI-4572 (Merck), CB 15 (Merck), R811 (Merck), S811 (Merck), MLC-6248 (Merck), BDH1281 (Merck). Such nanodimensioned dopants may include organic (carbon), inorganic (e.g., silica), or metallic (e.g., Au) nanoparticles, nanotubes (single and multiwall), or nanowires and quantum dots.

Additionally, in other embodiments, the compositions may further comprise non-mesogenic liquid crystal small molecules/liquid crystal monomers.

These compositions include those superposed onto a substrate, particularly nano- and micro-dimensionally patterned substrates. Such substrates may comprise an inorganic oxide (including silica or silica-containing glass and transparent conductive oxides such as indium tin oxide (ITO) and other transparent oxides, such as fluorine doped tin oxide (FTO) glass, inorganic nitride or carbide (e.g., $Si_3N_4$ or SiC), graphene, metal (e.g., Pd, Pt, Au), semiconductor (e.g., Si, GaAs, or InP), organic polymer, or combinations thereof.

These compositions also include those where the mesogenic compounds are aligned on the substrate. In order to control the liquid crystal alignment on a substrate, which is important to all the applications of liquid crystals, it is necessary to coat the substrate with the desired surface chemistry. Depending on the surface chemistry, liquid crystal molecules will align into different configurations. For example, to induce homeotropic anchoring (that is the LC molecules align vertically) on a substrate, the substrate can be coated with silicon dioxide, hydroxyl groups, or amino groups. To create planar anchoring (that is the LC molecules lie down in parallel to the substrate), a thin layer of polyimide can be coated on the substrate. To enhance the planar anchoring of liquid crystals on the substrate, it is also possible to rub polyimide in one direction to create microgrooves so that LC molecules will be pinned by the microgrooves, thus, aligning themselves along the microgrooves. Other possible surface treatment for planar anchoring is to coat the substrates with organic polymers consisting of polar groups, e.g. carbonyl, and ester, etc.

The ability to align liquid crystal molecules homogeneously is critical to any of the liquid crystal related applications, but it is very challenging to achieve microscopically or nanoscopically because the liquid crystal molecules need to respond to the substrate (including surface chemistry or topography). It is even more difficult to align liquid crystal monomers or polymers, which are considerably more viscous than liquid crystal small molecules. One of the many advantages of the inventive compounds and compositions lies in their strong anchoring abilities on various boundary conditions, much like other small molecules used in liquid crystal applications. After polymerization, the anchoring behavior remains unchanged, making it possible to directly visualize the defects formed in LCs.

In addition to pre-polymerized compositions, the disclosure includes those compositions in which the compositions are partially or fully polymerized compositions. Such polymerized compositions are generally, but not necessarily, nematic liquid crystals. In some embodiments, one of the inventive crosslinked mesogenic compounds are incorporated into a monomer or polymer precursor. Other embodiments include those liquid crystal compositions comprising a crosslinked mesogenic compound of any one of the compounds described herein. Such compositions include those liquid crystal compositions where any of the mesogenic compounds described herein are crosslinked with at least one crosslinking agent also described herein. Such polymerized compositions may also include any of the dopants described herein.

In addition to compounds and compositions described herein, various articles comprising these compounds and compositions are considered within the scope of this disclosure. While these compositions and compounds may be used in liquid crystal displays, they are more suited for applications which can take advantage of their large nematic operating window and strong anchoring ability onto a range of substrates. For example, these compositions and compounds are well suited to create liquid crystal polymers and for related applications. Their chemistry can be varied for different applications as we are doing now.

For example, some embodiments provide optical films, coatings, or encapsulants comprising any one of the inventive liquid crystal composition. In some of these embodiments, the film, coating, or encapsulant exhibits high positive birefringence.

Other embodiments include optical waveguides, actuators, sensors, artificial muscles, photovoltaic substrates or fuel cell membranes comprising at least one of the inventive liquid crystal compositions or polymers. The glassy nature of polymers derived from these compounds maybe very useful for high performance, high strength materials, e.g. for applications in aerospace, automobile or maybe interconnects. In other applications, the liquid crystal polymers may be useful in actuators/sensors/artificial muscles, where such LC elastomers are typically applied. In such applications, these LC elastomers change the size/shape in response to external stimuli. Again, the precise alignment of the LC molecules in the film, such as attainable with these materials, is critical. Consideration of these materials for actuators and sensors is based on their faster response, with little or no hysteresis, when altering the field.

The inventive compositions may also be incorporated into such diverse applications as mechanically or thermally tunable laser devices, mechanically or thermally tunable temperature sensors, optical polarizers, or even cosmetic pigments, in which case the polymer or liquid crystal comprises chiral dopant.

Additionally, the compounds and compositions of the instant disclosure may also be used in methods of estimating the elastic constant of a liquid crystal material and mapping defect structures in liquid crystals. Both methods rely on the ability to directly image defects formed in LC or LC/colloids in 3-dimensions with resolution down to 100 nm without the need of complex data interpretation and analyses. The ability to resolve images down to 100 nm resolution is one of the key advantages of these materials and methods.

Figure 7A:
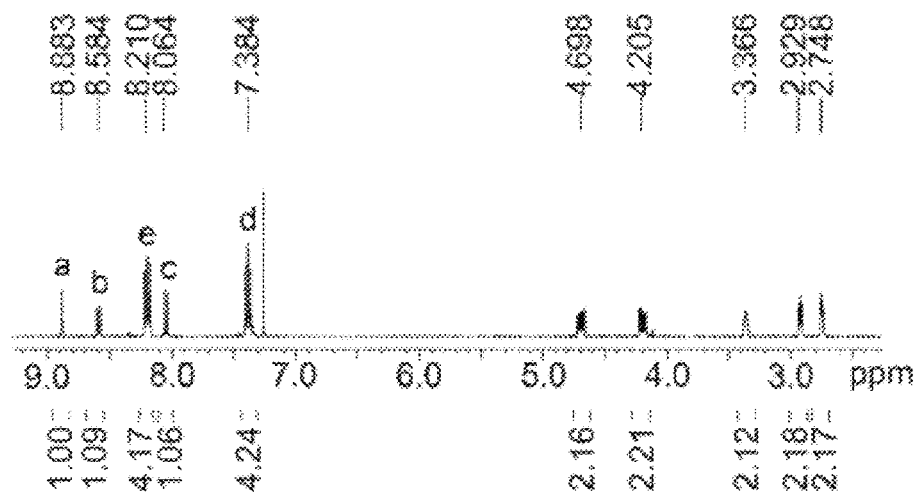
FIGS. 7A-7C show $^1$H-NMR spectra of the liquid crystal monomers (7A: LCM_X1, 7B: LCM_X2, or 7C: LCM_X3).
Figure 7B:
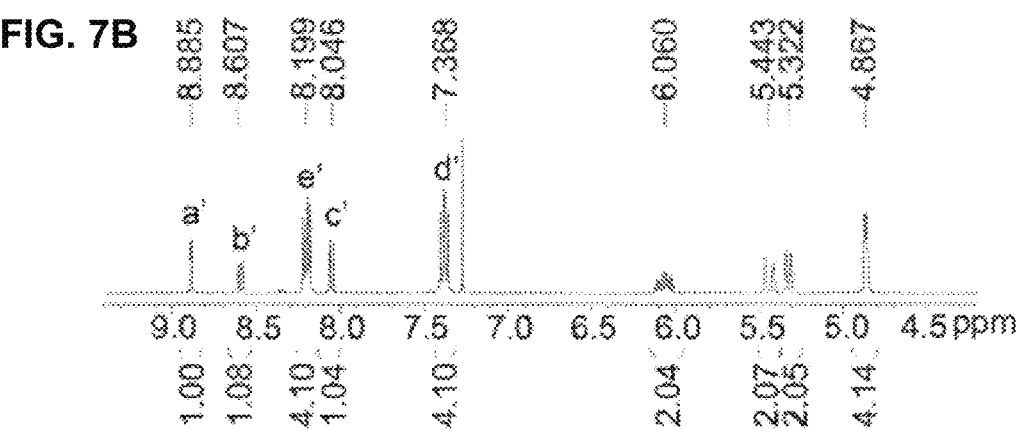
Figure 7C:
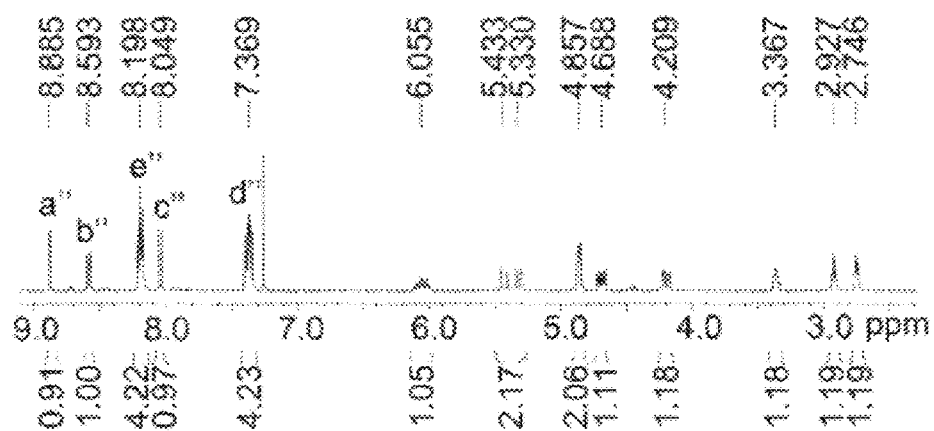

Certain embodiments provide methods of estimating the elastic constant of a liquid crystal material comprising incorporating at least one of the mesogenic compounds described herein into a matrix of polymerized liquid crystal material and imaging the matrix using scanning electron microscopy. Such methods are based on analyzing the director field from the images and measuring a) the local curvature of the director field related to the bend elastic constant, b) the nematic director orientation close to the topological defects, and c) the angle of molecular anchoring, in order to extract the elastic constants. The method can be extended to measure the twist elastic constant in chiral liquid crystal molecules. Further explanations of these phenomena are provided in the Examples. The ability of the molecule to align well with substrate allows the possibility of measuring the elastic constants whereas the traditional method is more cumbersome, based on the response of the LCM to an external field. The inventive materials allow for such methods because of their strong anchoring ability, their ability to maintain their orientation after polymerization, their glassy nature (which provides the ability to lock the orientation direction for SEM imaging), and their large nematic window (>100K, see, e.g., FIGS. 7A-7C). Nematic windows of common small molecule LC materials are much smaller 5CB, at 17K; 4'-n-octyl-4-cyano-biphenyl (8CB), at 7K; N-(4-Methoxybenzylidene)-4-butylaniline (MBBA), at 26K; CCN-47, at 27K; and cholesteryl benzoate, at 32K. Mixtures of nematics have larger nematic windows, e.g., Merck E7 (mixture of 5CB, 7CB, 80CB and 5CT, 68K) and ZLI-1840 (at 105K).

In other embodiments, methods of mapping defect structures in liquid crystals comprise incorporating at least one of the mesogenic compounds described herein into a polymerized matrix of the liquid crystal. These methods may further comprise imaging the defect structures or orientation/alignment of the LC molecules through the fractures (the observed fiber-like structures) polymerized liquid crystal matrix using scanning electron microscopy. Again, additional details of such methods are provided in the Examples. Similarly, the ability to seeing defect structures provides the ability to the control of LC alignment, as discussed above discussed above, thereby providing opportunities to tune or improve (or at least control) the properties of the liquid crystals.

It should be appreciated that such methods may be useful in developing electronic materials with high temperature stability and tailored isotropic coefficient of thermal expansion (CTE), dielectric constant (k), and loss tangent (tan δ) and structural materials with high strength vs. weight ratio. Accordingly, the materials developed using these inventive methods are also considered within the scope of the present disclosure.

EMBODIMENTS

Embodiment 1

A mesogenic compound having a structure of any one of Formula (I), (II), or (III):

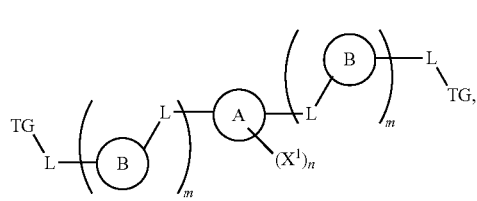

(I)

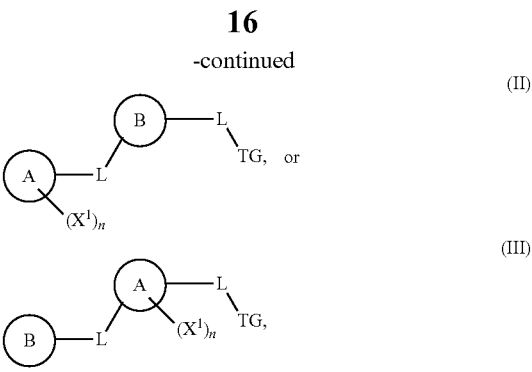

wherein
ring A and ring B are independently a 5-12 membered aromatic or heteroaromatic ring structure containing 1, 2, or 3 O, S, or N atoms in the ring structure;
L is a linking group comprising a dipolar group;
$X^1$ is $NO_2$, CN, Br, Cl, F, or $OCH_3$;
TG comprises an epoxy, glycidyl, acrylate, methacrylate, alkene, alkyne, oxetane, or other polymerizable group;
m is independently 1, 2, or 3 at each occurrence; and
n is independently 1, 2, or 3.

Embodiment 2

The mesogenic compound of Embodiment 1, wherein A is phenyl or pyridinyl.

Embodiment 3

The mesogenic compound of Embodiment 1 or 2, wherein B is independently phenyl or pyridinyl at each occurrence.

Embodiment 4

The mesogenic compound of any one of Embodiments 1 to 3, wherein A is phenyl and B is pyridinyl at each occurrence or A is pyridinyl and B is phenyl at each occurrence.

Embodiment 5

The mesogenic compound of Embodiment 1, wherein A and B are phenyl at every occurrence.

Embodiment 6

The mesogenic compound of any one of Embodiments 2 to 5, where each L is positioned para to one another on each A or B ring.

Embodiment 7

The mesogenic compound of Embodiment 6, where the relative positions of L with respect to ring A are:

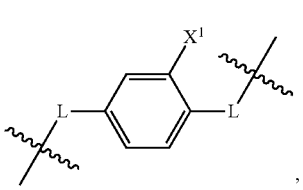

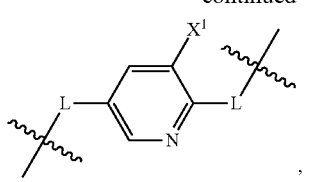

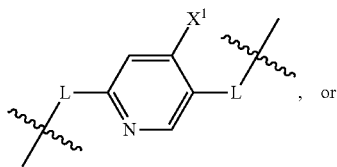, or

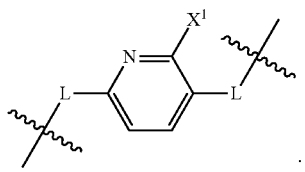

Embodiment 8

The mesogenic compound of Embodiment 1, wherein one or both of A and B are independently naphthyl, quinolinyl, or isoquinolinyl.

Embodiment 9

The mesogenic compound of Embodiment 6, wherein the relative positions of L with respect to the optionally substituted naphthyl, quinolinyl, or isoquinolinyl are:

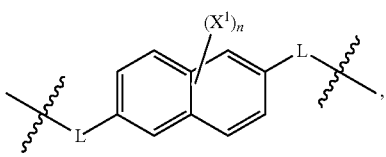,

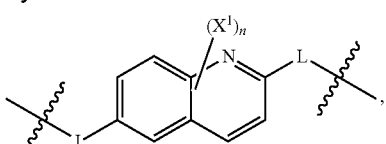,

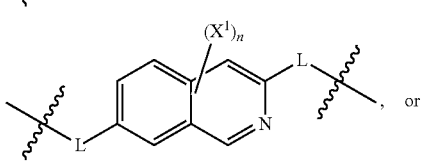, or

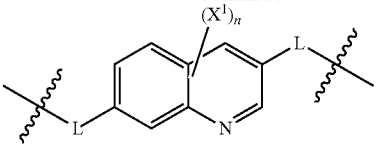

Embodiment 10

The mesogenic compound of any one of Embodiments 1 to 9, wherein:
L is independently at each occurrence —C(O)—, —C(C=NOH)—, —C(O)O—, —OC(O)—, —C(O)N(R¹)₂, —N(R¹)—C(O)—, —OC(O)O—, —OC(O)N(R¹)—, —N(R₁)C(O)O—, —S(O)—, —SO₂—, —CH(OH)—, or —C(OH)₂—; and
R¹ is independently at each occurrence H or $C_{1-3}$alkyl.

Embodiment 11

The mesogenic compound of any one of Embodiments 1 to 10, wherein L is independently at each occurrence —C(O)O—, —OC(O)—, —C(O)NH—, —NH₂—C(O)—, —C(O)N(CH₃)—, or —N(CH₃)—C(O)—.

Embodiment 12

The mesogenic compound of any one of Embodiments 1 to 11, wherein L is the same —C(O)O— or —OC(O)— at each occurrence.

Embodiment 13

The mesogenic compound of any one of Embodiments 1 to 12, wherein n is 1 and X¹ is nitro.

Embodiment 14

The mesogenic compound of any one of Embodiments 1 to 13, wherein TG independently comprises an epoxy or glycidyl group.

Embodiment 15

The mesogenic compound of any one of Embodiments 1 to 14, wherein TG is the same epoxy or glycidyl group in both occurrences.

Embodiment 16

The mesogenic compound of any one of Embodiments 1 to 15, wherein m is 1 or 2 and the same at each occurrence.

Embodiment 17

The mesogenic compound of any one of Embodiments 1 to 16, wherein m is 1.

Embodiment 18

The mesogenic compound of Embodiment 1, the compound being

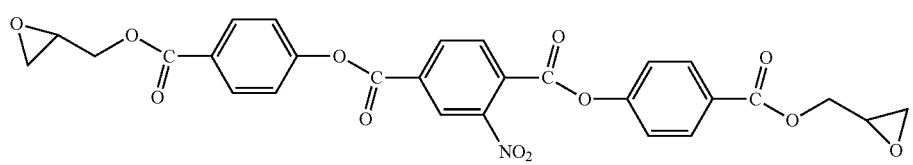 [SMILES: O=C(OCC1CO1)c1ccc(OC(=O)c2ccc(C(=O)Oc3ccc(C(=O)OCC4CO4)cc3)c([N+](=O)[O-])c2)cc1]

Embodiment 19

A composition comprising the mesogenic compound of any one of Embodiments 1 to 18 and a crosslinking agent.

Embodiment 20

The composition of Embodiment 19, wherein the crosslinking agent comprises a polyol, polyamine, aminopolyol, hydroxypolyamine, polyhydroxycarboxylic acid, a photoacid generator, or a combination thereof.

Embodiment 21

A composition comprising the mesogenic compound of any one of Embodiments 1 to 18 or a composition of Embodiment 19 or 20 further comprising at least one nanodimensioned dopant.

Embodiment 22

An article comprising the mesogenic compound of any one of claims 1 to 18 or the composition of any one of Embodiments 19 to 21, superposed on a nano- and micro-dimensionally patterned substrate.

Embodiment 23

The article of Embodiment 22, wherein the substrate comprises an inorganic oxide, nitride, or carbide, a metal, graphene, a semiconductor, an organic polymer, or combination thereof.

Embodiment 24

The article of Embodiment 21 or 22, wherein the substrate comprises silicon, silicon nitride (SiN), GaAs, or InP.

Embodiment 25

The article of any one of Embodiments 21 to 24, wherein the nano- and micro-dimensioned pattern includes parallel lines.

Embodiment 26

A liquid crystal composition comprising a crosslinked mesogenic compound of any one of Embodiments 1 to 18.

Embodiment 27

The liquid crystal composition of Embodiment 26, wherein the mesogenic compound of any one of Embodiments 1 to 18 is crosslinked with at least one crosslinking agent, for example comprising a polyol, polyamine, aminopolyol, hydroxypolyamine, polyhydroxycarboxylic acid, a photoacid generator, or a combination thereof.

Embodiment 28

The liquid crystal composition of Embodiment 26, further comprising a nanodimensioned dopant.

Embodiment 29

The liquid crystal composition of Embodiment 26, wherein the liquid crystal is a nematic liquid crystal.

Embodiment 30

A polymer precursor comprising a crosslinked mesogenic compound of any one of Embodiments 1 to 18.

Embodiment 31

The polymer precursor of Embodiment 30, wherein the mesogenic compound of any one of Embodiments 1 to 18 is crosslinked with at least one polyol, polyamine, aminopolyol, hydroxypolyamine, multifunctional acid or thiol.

Embodiment 32

The polymer precursor of Embodiment 26, further comprising a nanodimensioned dopant.

Embodiment 33

An optical film, coating, or encapsulant comprising a liquid crystal composition of any one of Embodiments 26 to 29 or a polymer precursor of any one of Embodiments 30 to 32 that exhibits high positive birefringence.

Embodiment 34

An optical waveguide comprising a liquid crystal composition of any one of Embodiments 26 to 29 or a polymer precursor of any one of Embodiments 30 to 32.

Embodiment 35

An actuator, sensor, or artificial muscle comprising a polymer precursor of any one of Embodiments 30 to 32.

Embodiment 36

A mechanically or thermally tunable laser device, a mechanically or thermally tunable temperature sensor, an optical polarizer or a cosmetic pigment or comprising a polymer precursor of Embodiment 32 with a chiral dopant.

Embodiment 37

A photovoltaic substrate or fuel cell membrane comprising a polymer precursor of any one of Embodiments 30 to 32.

Embodiment 38

A method of estimating the elastic constant of a liquid crystal material comprising incorporating a mesogenic compound of any one of Embodiments 1 to 18 into a matrix of polymerized liquid crystal material and imaging the matrix using scanning electron microscopy.

Embodiment 39

A method of mapping defect structures in liquid crystals comprising incorporating a mesogenic compound of any one of Embodiments 1 to 18 into a polymerized matrix of the liquid crystal.

Embodiment 40

The method of Embodiment 39, further comprising imaging the defect structures or orientation/alignment of the LC molecules through the fractures (the observed fiber-like structures) polymerized liquid crystal matrix using scanning electron microscopy.

Embodiment 41

A method of mapping defect structures in liquid crystals comprising incorporating a mesogenic compound of any one of Embodiments 1 to 18 into a polymerized matrix of the liquid crystal.

Embodiment 42

The method of Embodiment 41, further comprising imaging the defect structures or orientation/alignment of the LC molecules through the fractures polymerized liquid crystal matrix using scanning electron microscopy.

EXAMPLES

The following Examples are provided to illustrate some of the concepts described within this disclosure. While each Example is considered to provide specific individual embodiments of the methods of treatment and parameters and timings associated therewith, none of the Examples should be considered to limit the more general embodiments described herein.

Example 1: Experimental

Example 1.1. Materials

All chemicals were used without further purification. Dimethylformamide (DMF), dichloromethane (DCM), potassium hydroxide (KOH), sodium thiosulfate pentahydrate, and hydrochloric acid (HCl) were purchased from Fisher Scientific. Thionyl chloride ($SOCl_2$), 4-dimethylaminopyridine (DMAP), 2-nitroterephthalic acid, 4-hydroxybenzoic acid, metachloroperoxy-benzoic acid (MCPBA), (3-aminopropyl) triethoxysilane (APTES) allyl alcohol, and (±)-glycidol were purchased from Sigma Aldrich. 4-Cyano-4'-pentylbiphenyl (5CB) was purchased from Kingston Chemicals Limited. Polyimide (Durimide 32A) was purchased from Arch Chemicals, Inc. Liquid crystal monomers, 4-ethoxy-4'-(6-acryloylhexyloxy) azobenzene (LCM_AZO) was provided by the US Air Force Research Laboratory and RM257 (2-Methyl-1,4-phenylene-bis[4[3(acryloyloxy)propyloxy]benzoate]) was obtained from Merck.

Example 1.2. Characterization

Chemical structures of the synthesized chemicals were confirmed with $^1$H-NMR performed on a Bruker Advance DMX 360 (360 MHz) spectrometer at 25° C. and analyzed with TOPSPIN software.

Thermo analysis of the synthesized LCs was performed on a differential scanning calorimetry (DSC) Q2000 (TA instrument). Samples were heated and cooled under nitrogen with a ramping rate of 10° C./min for three cycles. Data from the second cycle was reported.

Liquid crystal phases and alignments were observed under an Olympus BX61 motorized optical microscope with crossed polarizers using CellSens software.

Example 2. Synthesis

Figure 6:
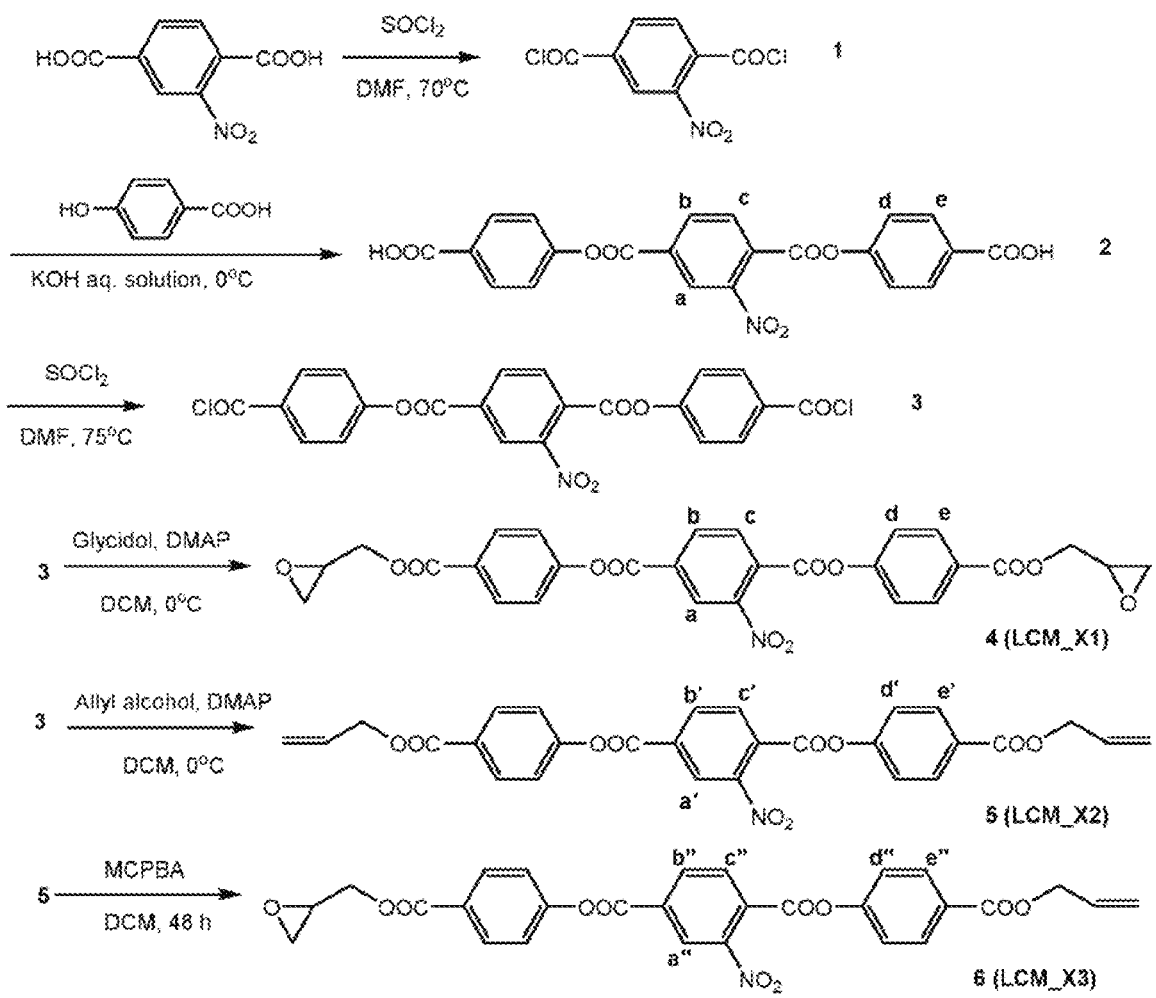
FIG. 6 shows a schematic illustration of the synthesis of the liquid crystal monomers, LCM_X1, LCM_X2, or LCM_X3.

Liquid crystal monomers, LCM_X1, LCM_X2, and LCM_X3 were synthesized in a four-step reaction as shown in FIG. 6.

Example 2.1: 2-Nitro terephthaloyl dichloride(1)

4.22 g 2-nitroterephthalic acid (20 mmol) was mixed with 20 mL thionyl chloride under stirring. Two drops of DMF were added as catalyst. The mixture was heated to 75° C. and refluxed until no bubbles were generated from the solution. The reaction mixture was then cooled down to room temperature, and excess thionyl chloride was removed in vacuo. The crude 2-nitro terephthaloyl dichloride was obtained as an orange oil and used in the next step without further purification.

Example 2.2: 2-Nitro, 1,4-Benzenedicarboxylic acid, 1,4-bis(4-carboxyphenyl) ester (2)

3.45 g 4-hydroxybenzoic acid (25 mmol) was gradually dissolved into 2.8 g KOH (50 mmol) aqueous solution (100 mL), and the solution was cooled in an ice water bath. 2.48 g of (1) (10 mmol) was dissolved in 15 mL ethyl acetate and added dropwise into the above prepared aqueous solution under vigorous stirring. After 30 min, the reaction was stopped and the mixture was neutralized by diluted HCl (5 vol %) aqueous solution to pH=7. The resulting precipitate was then filtered off by vacuum filtration, and washed with ethanol to yield 4.28 g product (2)(9.5 mmol, 95% yield) as a white solid. $^1$H-NMR (360 MHz, DMSO-d6): δ(ppm)= 7.41 (m, 4H, ArH of d), 8.02 (m, 4H, ArH of e), 8.36 (d, 1H, ArH of c), 8.65 (d, 1H, ArH of b), 8.79 (s, 1H, ArH of a).

Example 2.3: 2-Nitro, 1,4-Benzenedicarboxylic acid, 1,4-bis[4-(chlorocarbonyl)phenyl] ester (3)

4.06 g of (2) (9 mmol) was mixed with 15 mL thionyl chloride under stirring. Two drops of DMF were added as catalyst. The mixture was heated to 75° C. and refluxed until no bubbles were generated from the solution. The reaction mixture was then cooled down to room temperature, and the excess thionyl chloride was removed in vacuo. The crude product (3) was obtained as a white solid and used in the next step without further purification.

Example 2.4: 2-Nitro, 1,4-Benzenedicarboxylic acid, 1,4-bis[4-[(2-oxiranylmethoxy)carbonyl]phenyl] ester (4,LCM_X1)

1.3 g (±)-glycidol (17.6 mmol) and 3.90 g of (3) (8 mmol) were dissolved in 30 mL DCM, and the solution was cooled in an ice water bath at 0° C. 2.15 g DMAP (17.6 mmol) in 20 mL DCM was added dropwise into the above prepared solution under stirring. The reaction mixture was then gradually warmed up to room temperature, and kept for another 6 h. The completion of the reaction was monitored with thin layer chromatography (TLC) until the reactant (3) was completely consumed. The mixture was then filtered through a Celite pad, and the solvent was removed in vacuo. The resulting oil was purified by column chromatography (silica gel; DCM, followed by ethyl acetate:DCM, 1:15, v/v. Rf≈0.4) to yield 3.06 g (68% yield) final product (4) as a white solid. 1H-NMR (360 MHz, $CDCl_3$): δ(ppm)=2.75 (dd, 2H, —(O)COCH$_2$CHCH$_2$O), 2.93 (dd, 2H, —(O)

COCH$_2$CHCH$_2$O), 3.36 (m, 2H, —(O)COCH$_2$CHCH$_2$O), 4.20 (dd, 2H, —(O)COCH$_2$CHCH$_2$O), 4.71 (dd, 2H, —(O)COCH$_2$CHCH$_2$O), 7.38 (m, 4H, ArH of c), 8.04 (d, 1H, ArH of c), 8.20 (m, 4H, ArH of e), 8.59 (d, 1H, ArH of b), 8.88 (s, 1H, ArH of a).

Example 2.5: 2-Nitro, 1,4-benzenedicarboxylic acid 1,4-bis[4-[(2-propen-1-yloxy)carbonyl]phenyl] ester (5, LCM_X2)

A total of 1.02 g allyl alcohol (17.6 mmol) and 3.90 g of (3) (8 mmol) were dissolved in 30 mL DCM, and the solution was cooled in an ice water bath at 0° C. A total of 2.15 g DMAP (17.6 mmol) in 20 mL DCM was added dropwise into the above prepared solution under stirring. The reaction mixture was then gradually warmed up to room temperature and kept for another 6 h. The completion of the reaction was monitored with TLC until the reactant (3) was completely consumed. The mixture was then filtered through a celite pad, and the solvent was removed in vacuo. The resulting oil was purified by column chromatography (silica gel; eluent: DCM, followed by ethyl acetate: DCM=1:30 vol/vol) to obtain 2.83 g (5) (66.5% yield) as a white solid. 1H-NMR (360 MHz, CDCl$_3$): δ(ppm)=4.87 (dd, 4H, —(O)COC$\underline{H}_2$CHCH$_2$), 5.32 (d, 2H, —(O)COCH$_2$CH$\underline{CH_2}$), 5.44 (d, 2H, —(O)COCH$_2$CH$\underline{CH_2}$), 6.06 (m, 2H, —(O)COCH$_2$C$\underline{H}$CH$_2$), 7.37 (m, 4H, ArH of d'), 8.04 (d, 1H, ArH of c'), 8.20 (m, 4H, ArH of e'), 8.60 (d, 1H, ArH of b'), 8.88 (s, 1H, ArH of a').

Example 2.6: 4-(4-(((Oxiran-2-yl)methoxy)carbonyl)phenyl 1-(4-((allyloxy)carbonyl)phenyl) 2-nitrobenzene-1,4-dioate (6, LCM_X3)

A total of 6.8 g (12.8 mmol) of (5) was dissolved in 30 mL DCM at 0° C. A total of 3.31 g MCPBA (20 mmol) was gradually added to the solution. The reaction mixture was then warmed up to room temperature and allowed to stir for additional 48 h. After reaction, the white precipitate was filtered off and the resulting solution was washed twice with sodium thiosulfate pentahydrate aqueous solution and then washed twice with brine. The solution was then dried with MgSO$_4$ and the solvent was removed in vacuo. The crude solid was purified by column chromatography (silica gel; eluent, DCM, followed by ethyl acetate: DCM=1:30 vol/vol) to obtain 2.1 g (6) (30% yield). 1H-NMR (360 MHz, CDCl$_3$): δ(ppm)=2.75 (dd, 1H, —(O)COCH$_2$CHC$\underline{H}_2$O), 2.93 (dd, 1H, —(O)COCH$_2$CHC$\underline{H}_2$O), 3.36 (m, 1H, —(O)COCH$_2$C$\underline{H}$CH$_2$O), 4.20 (dd, 1H, —(O)COC$\underline{H}_2$CHCH$_2$O), 4.71 (dd, 1H, —(O)COC$\underline{H}_2$CHCH$_2$O), 4.87 (dd, 2H, —(O)COC$\underline{H}_2$CHCH$_2$), 5.32 (d, 1H, —(O)COCH$_2$CHC$\underline{H}_2$), 5.44 (d, 1H, —(O)COCH$_2$CHC$\underline{H}_2$), 6.06 (m, 1H, —(O)COCH$_2$C$\underline{H}$CH$_2$), 7.38 (m, 4H, ArH of d''), 8.04 (d, 1H, ArH of c''), 8.20 (m, 4H, ArH of e''), 8.59 (d, 1H, ArH of b''), 8.88 (s, 1H, ArH of a'').

Example 3. Liquid Crystal Polymers

Example 3.1. Preparation of Liquid Crystal Monomer Solutions 200 mg liquid crystal monomer (LCM_X1) and 4 mg Irgacure 261 (2 wt %, Ciba Specialty Chemicals) as photoacid generator (PAG) were dissolved in 10 g DCM, and kept in a cool and dark place before use.

Example 3.2. Fabrication of Patterned Substrates

All the patterned substrates were fabricated by replica molding from commercially available epoxy (D.E.R. 354, Dow Chemical) on glass slides using PDMS molds, following the procedure reported in the literature.

Example 3.3. Preparation of Substrates with Desired LC Anchoring (1) Homeotropic anchoring of LCs on flat substrates, porous membranes, and square channels. The anchoring type of the LC (homeotropic or planar) largely depends on the surface energy of the interface. For many types of LCMs, hydrophilic surfaces with high surface energy usually give homeotropic anchoring: LCM_X1 was found to have homeotropic anchoring on an SiO$_2$ surface. Here, we used pre-cleaned glass slides as the flat substrates and coated other patterned substrates with a thin layer of SiO$_2$ through a chemical vapor deposition (CVD) process according to the literature. Specifically, patterned substrates were first kept in a desiccator under vacuum, where 0.2 mL silicon tetrachloride (SiCl$_4$) liquid served as the source of chemical vapor, and treated for 10-15 min. Then the samples were exposed to a humidity chamber (humidity~90%) for 10 min, followed by immersion in a pyridine aqueous solution (3 vol %) for 5 to 10 min. The final substrates were obtained by washing with ethanol and DI water, respectively, three times, followed by drying by air gun and baking at 100° C. in a convection oven for 15 min to 1 h.

(2) Strong homeotropic anchoring of LCs on micropillar arrays: To achieve high homeotropic anchoring energy, additional treatment based on step (1), followed by functionalization of the SiO$_2$ surface with APTES was provided. Due to the Michael-addition reactions between the amino groups in APTES and epoxy groups in LCM_X1, the newly formed surface anchored LCM-X1 with the mesogenic groups oriented perpendicularly to the interface. As a result, the interaction between the interface and LCM molecules was substantially increased, showing stronger homeotopic anchoring than the SiO$_2$-coated surface. The sample consisting of a micropillar array was immersed in a 1 vol % APTES/(ethanol:water=90:10 v/v) solution for ~10 min, followed by rinse with ethanol and DI water, respectively, three times, and dried by air gun. Finally, the sample was baked in a convection oven at 100° C. for 15 min to 1 h.

(3) Planar anchoring: To create planar anchoring for the LCMs, a glass substrate was spin-coated with a thin layer of polyimide from xylene solution at 5000 rpm/s (on a spin coater WS-650Hzb-23NPP-UD-3; Laurell) for 30 s, followed by baking at 130° C. for 20 min. A uniform planar anchoring sample was obtained by rubbing the polyimide coated substrate with a velvet cloth.

Example 3.4. Liquid Crystal Cell Preparation

On patterned substrates: ~20-40 μL LCM_X1/DCM solution was placed on the patterned substrate, and solvent was evaporated at 130° C. for at least 10 min. Then the LCM_X1 liquid was sandwiched between the substrate and another cover glass (treated if needed) at 130° C. The sample was then cooled down to the desired temperature (cooling rate not critical here) to align LC. With silica colloids: 5 μm (diameter) silica colloids (Sigma Aldrich) were dispersed in a LCM_X1/DCM solution (Note, a high concentration of ~20 wt % was preferred), and the mixture was sonicated for at least 15 min to obtain a homogeneous suspension. To prepare LC cell with silica colloids, several drops (~20-40 μL) of the suspension were placed on a clean glass slide, and solvent was evaporated at 130° C. for at least 10 min. Then another pre-cleaned glass slide was placed on top to make a LC cell. Thickness of the LC cell was roughly controlled as ~10 μm. The sample was then cooled down from 130° C. to the desired temperature (cooling rate not critical here) to align the LC.

Example 3.5. UV Crosslinking

To prevent the re-orientation of the directors of LCM_X1 during photopolymerization, UV curing was carefully performed in three steps, including:
(1) Samples were slowly cooling down at 1° C./min to room temperature (~25° C.);
(2) Sample was exposed to a low UV power (~2 mw/cm² at 365 nm, Hg lamp), overnight.
(3) After UV exposure, samples were slowly heated up to 100° C. at a ramping rate of 1° C./min on a Mettler FP82 and FP90 thermo-system hot stage in ambient air, followed by baking at 120° C. for another 1-2 h to completely cure the epoxy groups.

Example 3.6. Characterization

LCP samples were manually broken into pieces or cut with a razor blade. The cross-section was evaporated with 4 nm iridium for SEM imaging on a FEI Strata DB235 FIB SEM with 5 KV E-beam.

Example 3.7. Measurement of Refractive Index and Birefringence

Figure 2A:
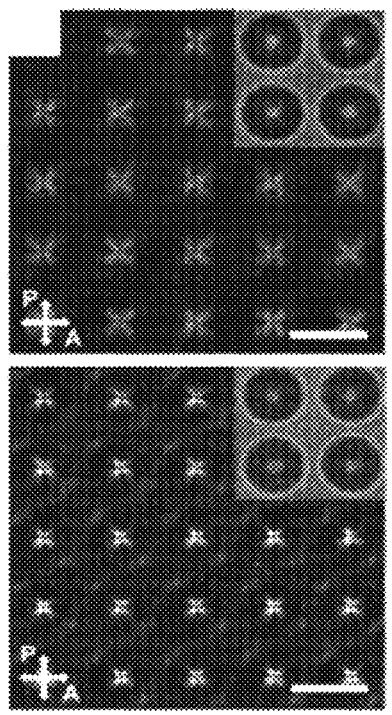
FIGS. 2A-2E show polarized optical microscopy (POM) and bright field (BF) microscopy images of 4-cyano-4'-pentylbiphenyl (5CB) and LCM_X1. (A-C): POM and BF images of 5CB (top panels) and LCM_X1 (bottom panels) in (2A) porous membranes (pore diameter: 10 μm, pitch, or pore-to-pore distance: 15 μm, depth: 20 μm), (2B) pillar arrays (pillar diameter: 10 μm, pitch: 20 μm, height: 19 μm), and (2C) square channels (width: 10 μm, pitch: 40 μm, depth: 20 μm) with homeotropic anchoring imposed at all surfaces. Insets in (2A): BF image of LCs in pores where the dark dots at the center show possible topological defects (from now on referred to as "defects"); Insets in (2B): BF image with black circles showing possible bulk line defects circumscribing the pillars; Insets in (2C): BF image of a single ridge where the gray color indicates a distorted director field but no defect (so-called "escape in the third dimension"); (2D-2E) POM images of the schlieren texture of LCM_X1 before (2D) and after (2E) UV curing. Insets in (2D & 2E): BF images both show possible bulk line defects. The similar nematic texture between (2D & 2E) indicates director field was well maintained during polymerization. Scale bars applicable to all panels: 20 μm.
Figure 2B:
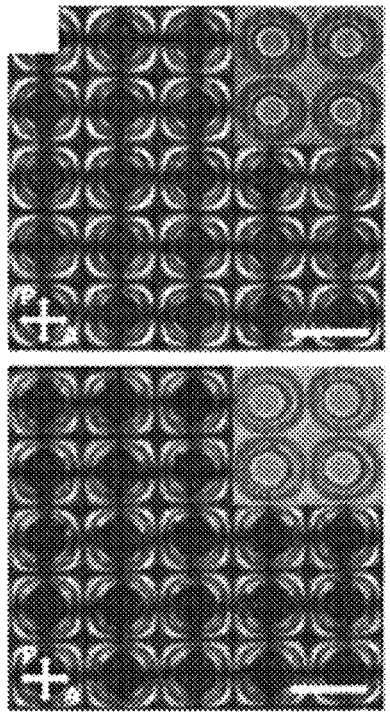
Figure 2C:
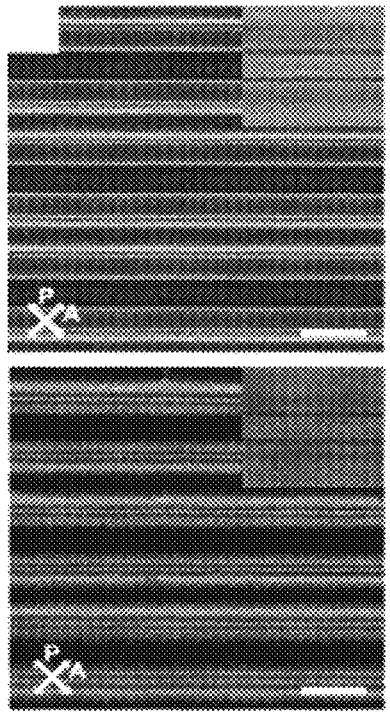
Figure 2D:
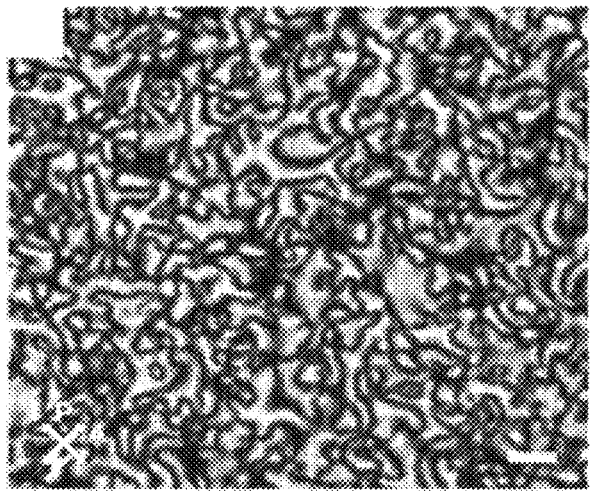
Figure 2E:
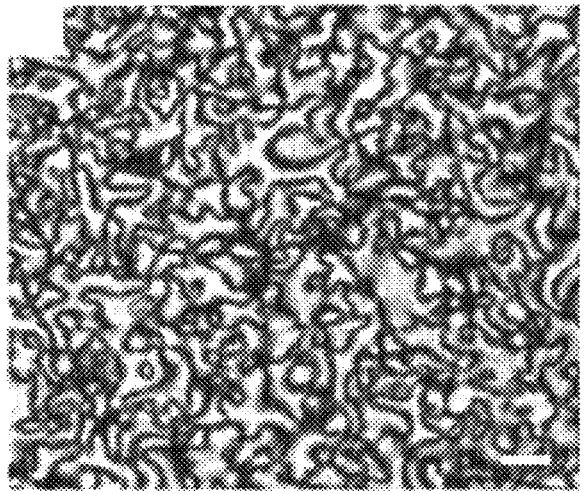

Snell's law was used to estimate the refractive indexes of LCM_X1 by comparing the apparent thickness of the LC cell, $D_{LC}$, with the actual cell thickness without LC, $D_0$; that is, $n_{e,o}=D_0/D_{LC}$. A uniform planar cells was prepared as previously described. $D_0$ and $D_{LC}$ were measure before and after LC was infiltrated, respectively. Accordingly, the extraordinary refractive index, $n_e$~1.67±0.02 and the ordinary refractive index, $n_o$~1.5±0.02 of LC when the polarized light was parallel and perpendicular to the LC director, respectively. The birefringence of LCM_X1 was estimated as ~0.17. The birefringence of LCM_X1 was also estimated from a wedge cell, using the Michael-Levy chare before and after UV curing, as 0.16±n=0.02, which was in good agreement with that measured from optical microscopy. The consistent birefringence before and after polymerization as shown in FIG. 2D-2E indicates that the polymerization did not affect the nematic order parameter.

Example 4. Estimation of the LC Elastic Constants

As a proof-of-concept, the elastic anisotropy of LCM was estimated from the SEM images (see FIG. 17), of the LCs homeotropically anchored on the walls of a cylindrical pore. The director here "escapes in the third dimension" through a splay/bend deformation. Angle θ is analyzed, that the nematic director adopts at any point relative to the axis of the pore (see FIG. 17 inset), as a function of the radius r, which goes from the center of the pore to its walls. The results are plotted in FIG. 17. The data points can be satisfactorily fit by (2).

$$\theta(r)=2\tan^{-1}(\alpha r/R_0) \tag{1}$$

where $R_0$ is the width over which the escape takes place (the radius of the pore), and α is a parameter that depends on the anchoring angle of the director on the homeotropic wall. Specifically, α is equal to the cotangent of the anchoring angle φh at the homeotropic wall of the capillary divided by two. Eq. 1 is the theoretical prediction for the escape configuration in a cylindrical channel in the approximation of single elastic constant. It holds when the splay constant and the bend constant are equal.

Figure 17:
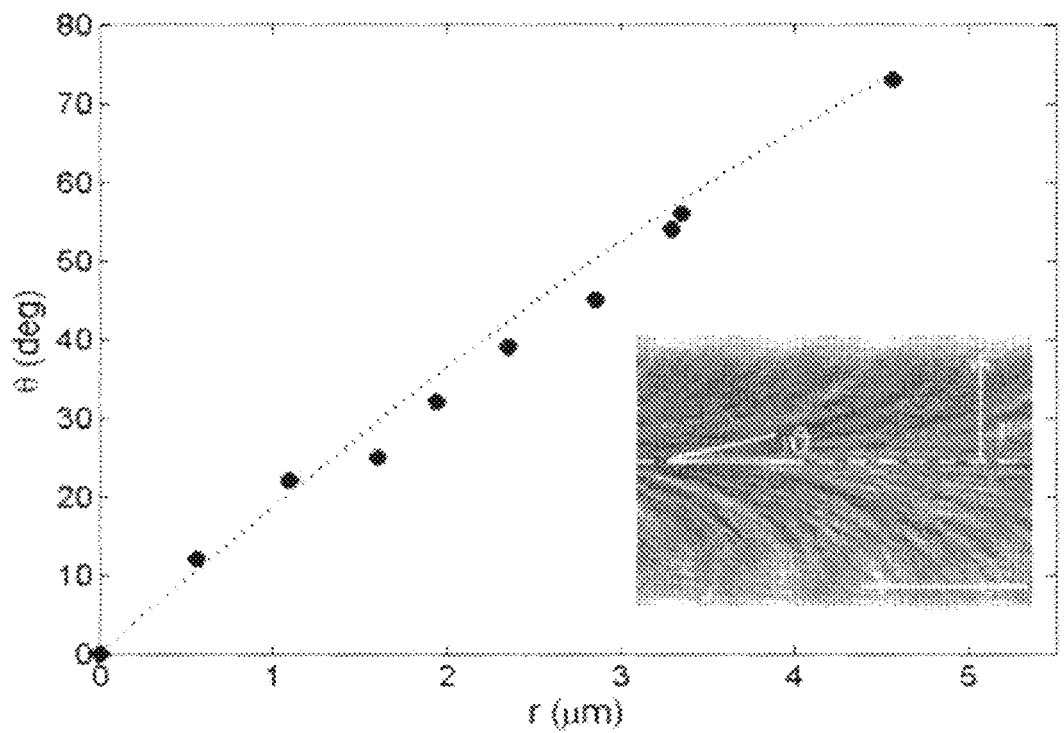
FIG. 17 is a line graph showing the director angle as a function of the radial coordinate r. The points are calculated from the escape configuration shown in the inset (scale bar, 5 µm). The line is calculated from Equation 1.

There is no a priori reason why this should be true for the monomers described herein. However, FIG. 17 shows a good agreement between the experimental data and the theoretical prediction, which suggests that the ratio between splay and bend constant for the monomers is close to one. As shown in the literature, elastic anisotropy would lead to deviations from this curve. Information about the twist elastic constant is not obtained in this configuration, but the lack of twisted escape configuration (observed, for example, in phases with very low twist elastic constant), combined with the observed structure of the hedgehogs near colloids, suggests that the twist elastic constant is of the same order of magnitude as the other two. From Eq. 1 and models described in the art, the extrapolation length for homeotropic anchoring can also be estimated, i.e. the ratio between the elastic and the anchoring constant. The anchoring angle $\varphi_h$ on the homeotropic wall is $\varphi_h=\sin^{-1}(((R_0 W_h+K_{24})/K-1)^{-1})$, where $W_h$ is the homeotropic anchoring constant, K is the elastic constant (always in the one elastic constant approximation), and $K_{24}$ is the saddle-splay constant. If the common approximation of neglecting $K_{24}$ is made, the extrapolation length $\xi_h=K/W_h=1.3\mu$ is obtained.

In order to estimate the extrapolation length in the case of weak planar anchoring, a hybrid wedge cell was used, with one glass untreated (for homeotropic anchoring) and the other one treated with rubbed polyimide. Following the method in the literature, the extrapolation length can be estimated by directly measuring the angles formed by the liquid crystals in a hybrid wedge cell with the homeotropic and the planar surfaces, and relating them as:

$$2\xi_h(\varphi_p-\varphi_h)=d\sin(2(\Phi_h-\varphi_h)) \tag{2}$$

$$2\xi_p(\varphi_p-\varphi_h)=d\sin(2(\Phi_p-\varphi_p)) \tag{3}$$

Figure 18:
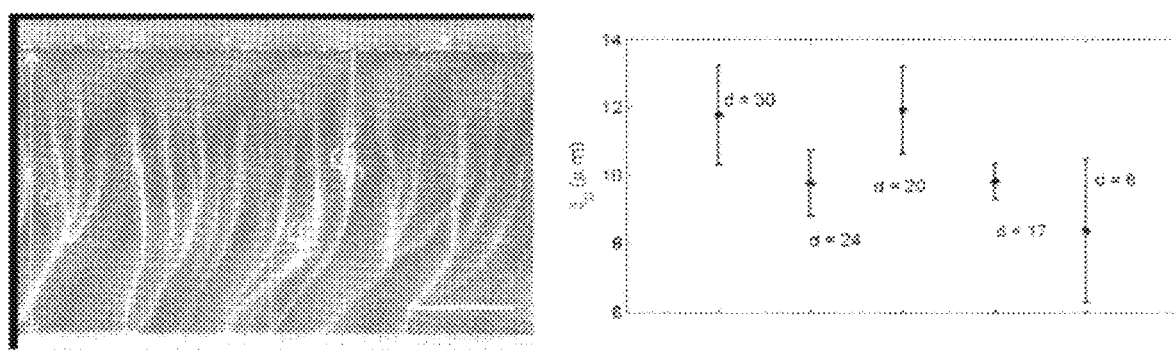
FIG. 18 is a SEM image of a hybrid wedge cell (left panel), with highlighted angles at the planar and homeotropic surface, and the corresponding measurements of the planar anchoring extrapolation length (right panel) taken from the cell at different cell thicknesses (indicated next to each data point, in microns). Scale bar in SEM image, 10 µm.

Here, the subscript p and h represent the planar and the homeotropic surfaces, respectively, d is the cell thickness, ξ the extrapolation length, Φ the preferred angle with respect to the normal and the flat surface (that is, Φh is zero and Φp is π/2), φ is the angle that the nematic director forms with the normal to the cell surface (FIG. 18). The approximation that the ratio of the splay and bend elastic constant is close to unity is also made. The extrapolation length can then be estimated at various thicknesses of the wedge cell. ξh could be estimated from the study of LCM in the pores with homeotropic anchoring, and that with planar anchoring, ξp.

The preferred tilt angle on the planar polyimide surface could be independently estimated by measuring it directly from the SEM images on a planar cell. The points in the SEM image shown in FIG. 18 represent measurements of the extrapolation length at different thickness of the wedge cell, ranging from 6 μm to 30 μm, which gives a value of the planar extrapolation length~10 μm, i.e. ten times longer than the homeotropic extrapolation length. This clearly shows that the anchoring is weaker on the polyimide than on the silica surface. Direct visualization of the director profile by SEM image makes it extremely simple and direct to calculate the relevant parameters for the newly synthesized LC.

A crude estimate of the elastic constants can be obtained simply by dividing the energy necessary to align the mesogens (i.e. the thermal energy at the temperature at which the mesogen achieves its alignment, around 370K) by the molecular size a.:

$K=k_B T/a=1.4*10^{-23}*370\ K*0.5*10^9\ m^{-1}=2.6*10^{-12}\ N$

Consequently, the homeotropic anchoring constants can be calculated as the ratio between the elastic constant and the extrapolation length: $W_h=2.6*10^{12}$ N/1.3 μm=$2*10^{-5}$ N/m and $W_p=2.6*10^{-6}$ N/m.

Example 5

Since the surface energy of the boundary determines the anchoring behavior of liquid crystal molecules (homeotropic or planar), patterned surfaces with both high (PVA) and low (DMOAP) surface energy were prepared. However, as seen from FIGS. 13A-13H, it is clear that both LCM_AZO and RM257 fail to align uniformly on patterned surfaces regardless of the surface energy of the coatings and surface geometry. They mostly show polydomains with disclination lines either in the bulk or pinned to the boundaries.

Although this non-equilibrium alignment can be improved by carefully annealing the sample through the nematic-isotropic phase transition, it is non-trivial to achieve the ideal equilibrium state with monodomains.

Example 6. Further Discussion

Figure 1B:
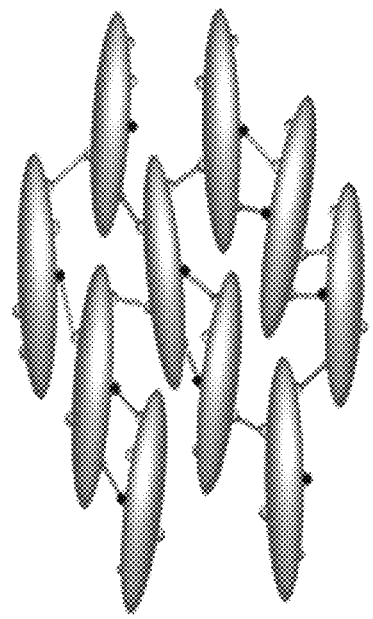
Figure 8A:
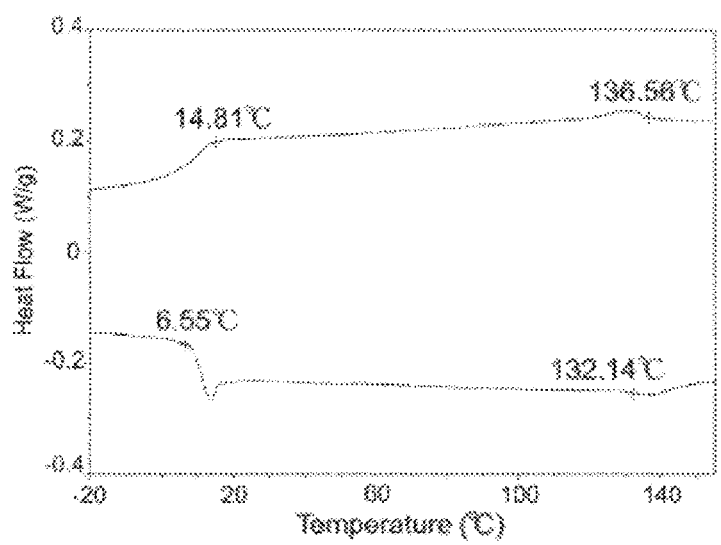
FIGS. 8A-8C show DSC curves of the LCMs. (8A) LCM_X1. A nematic phase from 6.5° C. to 132° C. (heating) and 136° C. to 15° C. (cooling), respectively, was observed. (8B) LCM_X2. A nematic phase was only observed upon cooling from 101° C. to 57° C. A small peak at about 67° C. was observed, which could be attributed to packing of the end alkene groups of LCM_X2, since the system was still in the nematic phase at 65° C. as verified by POM. (8C) LCM_X3. A nematic phase was shown from −9° C. to 72° C. (heating) and 77° C. to −4° C. (cooling), respectively.
Figure 8B:
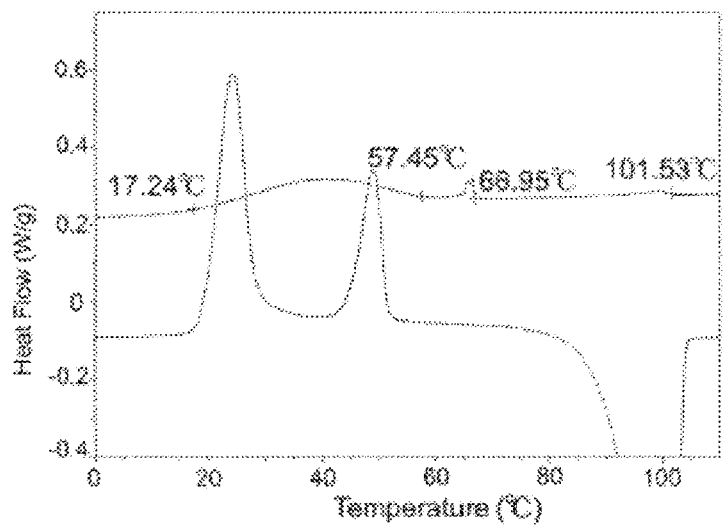
Figure 8C:
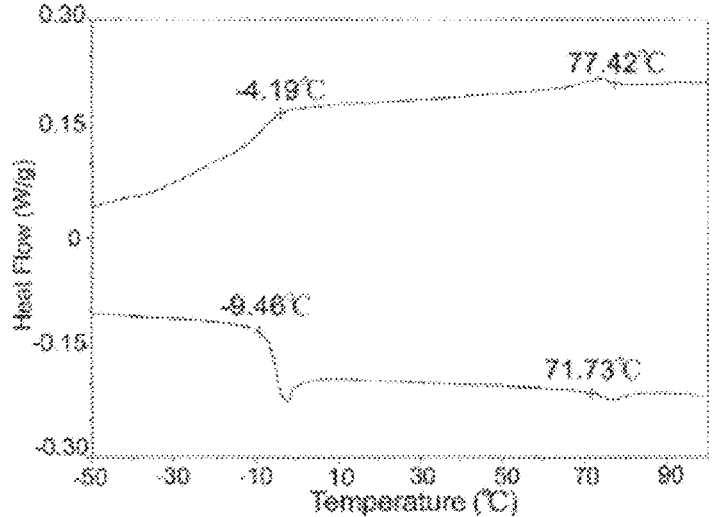

Though functional LCMs have been employed for decades in conjunction with LCPs as actuators and sensors, it is a challenge to achieve faithful anchoring control at the level of the old stalwart, 5CB (4-pentyl-4'-cyanobiphenyl). Slow relaxation of the bulk director field in LCMs, especially under complex confinement is an inherent obstacle. To address the problem of equilibration, LCMs (LCM_X1, FIGS. 1A-1B) with highly stable nematic phases, have been synthesized. As illustrated in FIGS. 1A-1B and 6, one embodiment of the present disclosure provides an aromatic ester-based mesogenic group, both common and inexpensive to synthesize, as one starting point to introduce an ortho-substituted nitro group and diepoxy terminal groups (while the present disclosure is described in terms of such nitro and epoxy groups for clarity, it should be appreciated that the disclosure is not limited to these groups in these positions). A nitro group was introduced in the belief that: i) LCs with a nitro group at the ortho-position to a linkage ester group typically form a nematic phase with a relatively low phase transition temperature and, more importantly, ii) the introduction of a polar group (like nitro) or polarizable group into the chemical structure may result in an increase of molecular polarity, affecting molecular packing and, in turn, the phase stability of LCs. In particular, aromatic ester-based mesogens could achieve a stable nematic phase through strong intermolecular dipole-dipole interactions between carbonyl groups of adjacent molecules, an effect that increases with the molecular interaction. Therefore, the LCM molecules were designed to induce a network of strong dipole-dipole interactions between four carbonyl groups (dipole moment μ=2.4 D) evenly distributed along the molecule and a more polar nitro group (=4.01 D) in the middle of the molecule. Because each nitro group binds randomly to one of the four sites from the adjacent LC molecule, crystallization is suppressed, leading to a highly stable nematic phase (FIGS. 8A-8C) with strong surface anchoring properties for all synthesized LCMs (FIGS. 2A-2C and 14A-14C). LCM_X1 has an large nematic window (>100K) (FIGS. 8A-8C), with the nematic phase starting slightly above its glassy transition temperature (about 10° C.). FIGS. 8A-8C also show that LCM_X1 and X3 did not crystallize upon cooling while LCM_X2 presented crystallization spreading over a large temperature range (about 57° C. to about 17° C.). Crystallization of all LCMs was suppressed since there are multiple bonding sites with strong intermolecular dipole interactions. UV curable diepoxy groups are introduced at the ends of the mesogens, which can be rapidly crosslinked by photoacids without large volume change, thus, locking the orientational order of mesogens for later SEM imaging.

In order to understand whether the LCM_X1 could be aligned, an anchoring study was conducted on some well-studied, patterned substrates, including membranes with cylindrical pores, pillar arrays, and square-shape channels (FIGS. 2A-2E). As a controlled comparison, the same geometries were used to anchor 5CB. FIGS. 2A-2E shows polarized optical microscopy (POM) and bright field (BF) images of both 5CB and LCM_X1 on these various substrates all treated for strong homeotropic anchoring. Though the surface treatments that align LCM_X1 differ from those for 5CB (see Examples), they are equally easy and inexpensive: for example, homeotropic anchoring is achieved for LCM_X1 on a silica coated surface while planar anchoring is achieved with polyimide treatment (FIGS. 10A and 10B). This is in sharp contrast to the behavior of commonly used LCMs, RM257 and LCM-AZO, which exhibit polydomains on the same substrates regardless of surface treatment (FIGS. 13A-13H). LCM and 5CB were observed to exhibit almost identical director configurations on all of the patterned substrates shown in FIGS. 2A-2C and 14. FIGS. 14A-14C clearly demonstrates that even without careful cooling, the samples achieved equilibrium quickly and formed organized anchoring configurations over the entire sample area.

Note that in the membranes with cylindrical pores with homeotropic anchoring on all boundaries, the nematic director either forms a bulk topological point defect with integer topological charge (±1, where we consider +1 point defect a radial hedgehog and −1 a hyperbolic hedgehog) in the center or it "escapes into the third dimension" to separate two half-defects on the boundaries. Likewise, in the pillar arrays, there could be a bulk disclination ring (a circular defect line with winding number +½ or −½) surrounding the pillars or an "escape" configuration where the defects are all concentrated next to the pillar edges. However, both POM and BF microscopy cannot distinguish these two modalities without further investigation of the director field through the whole sample or through the use of a variety of state-of-the art tools such as confocal polarized microscopy. To freeze the orientation of LCs, the LCMs were crosslinked through cationic polymerization of epoxy, a common functional group in negative-tone photoresists. Compared to acrylate and methacrylate groups that are often used in radical polymerization of LCMs, epoxies have several advantages that are key to the present inventive LCM design:

1) They are insensitive to ambient oxygen.

2) They can be crosslinked efficiently through chemically amplified ring-opening reactions; each photogenerated acid can initiate hundreds of reactions locally, rendering fast polymerization without the volume shrinkage seen in (meth) acrylate polymers.

Figure 3A:
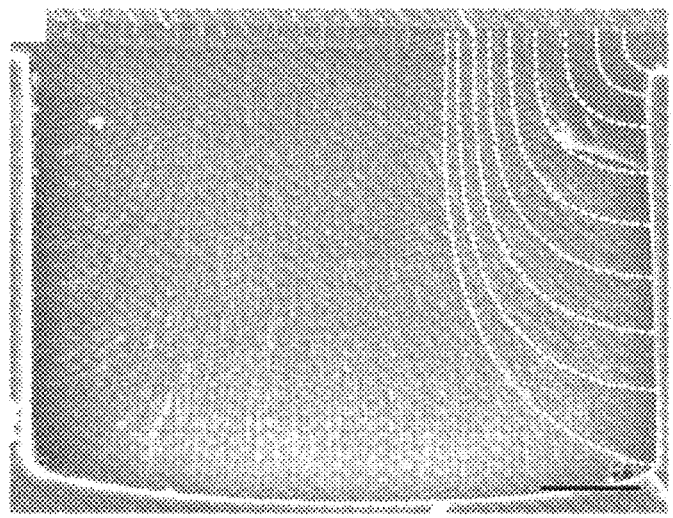
FIGS. 3A-3C are SEM images showing the fracture structure of liquid crystal polymer ("LCP") after polymerization in a channel (3A), in a pore (3B), and between two pillars (3C). Defect-free director field of LC "escaping in the third dimension" can be read off from the orientation of the fracture structures in all three structures. The dotted lines in (3A-3C) represent local director field of LCM mirrored in the other half of images. Scale bars: (3A): 5 μm; (3B & 3C): 2 μm.
Figure 3B:
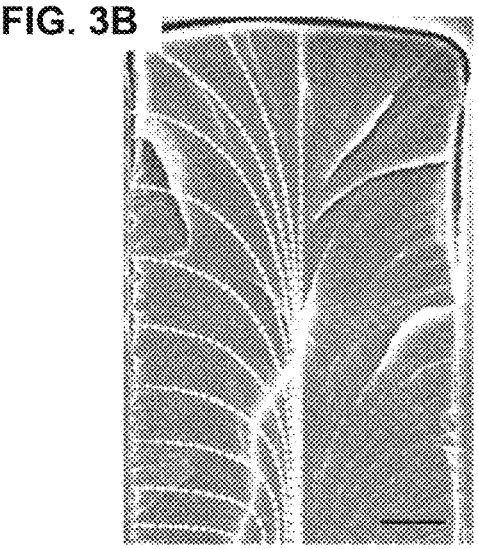
Figure 3C:
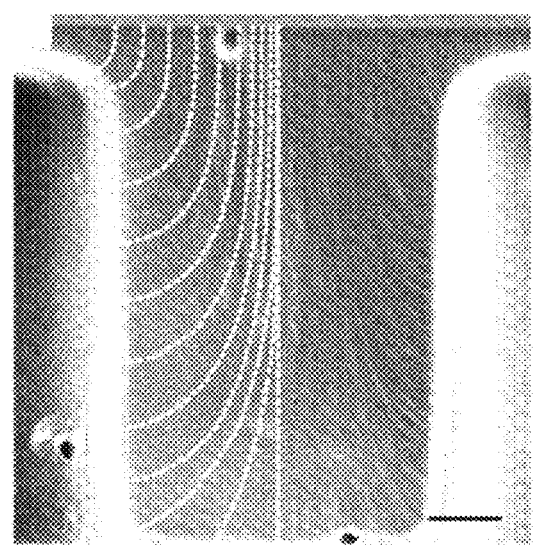

3) The bulky aromatic ester mesogens limit acid diffusion at room temperature, therefore, photopolymerization occurs locally. Together with the strong dipole-dipole intermolecular interactions, the inventive LC molecules can be locked in position effectively without altering the field direction during polymerization. To further suppress reorientation during crosslinking, the materials were UV cured at room temperature (~25° C.) with a low UV light intensity (2 mW/cm$^2$), keeping the viscous timescales longer than the polymerization timescale (see detailed steps in Examples). From the birefringence of the material and POM images of samples before and after polymerization (FIGS. 2D, 2E and 9A-9D), it was possible to confirm that the director field was well-maintained during polymerization. Once polymerized, SEM was used to directly visualize the nematic texture with nanoscale resolution of the director configuration in various cross-sections obtained by fracturing the sample at room temperature. As a result of the anisotropic mechanical properties of LCPs, the elastic modulus was usually much smaller perpendicular to the director, and the polymerized sample fractures along surfaces normal to the director field. As shown in FIGS. 3A-3C, 10A-10B, and 16A-16C, the local director field was visible under SEM, represented by the nano-size fiber-like fracture structures, which are the footprints of the director field. It does not appear that the polymer itself forms fibers or that the fibrous structures observed in SEM was a consequence of the optical contrast of the fractured domains. By following the fracture structures, it was possible to map the LC alignment directly, with 100 nm resolution, as illustrated by the red dotted line in FIGS. 3A-3C. From FIG. 3A, the angle of molecular alignment at the surface was determined to be 90° inside a wide channel; likewise, it was shown that homeotropic anchoring breaks down when the director field is tightly confined as shown in FIGS. 3B-3C. Relative to the nature of the defect structure in pores, pillar arrays, and channels, it was shown that the director most often adopted an escaped configuration, avoiding defects. By contrast, in POM the observed point- and line-like structures could just as well be the sign of a distorted director field or a defect. Further, from the micrographs an approximate value of the extrapolation length of the LCM for planar and homeotropic anchoring (details in Examples). The Frank constant was determined to be on the order of a pico-Newton, in line with elastic moduli of other LCs.

Figure 4A:
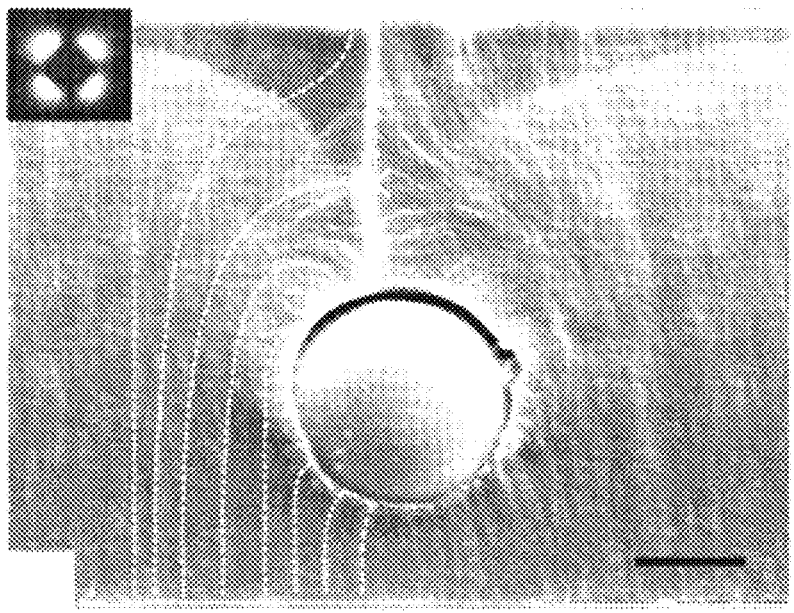
FIGS. 4A-4B show SEM images of silica colloids suspended in LCP where either a point defect (4A) or a line defect (4B) was formed to screen the charge of the colloid. Insets: POM images of point (4A) and line (4B) defects circumscribing silica colloids. The director field of the LC is represented by the dotted line and the crosses show the position of defects. Scale bars: 2 μm
Figure 4B:
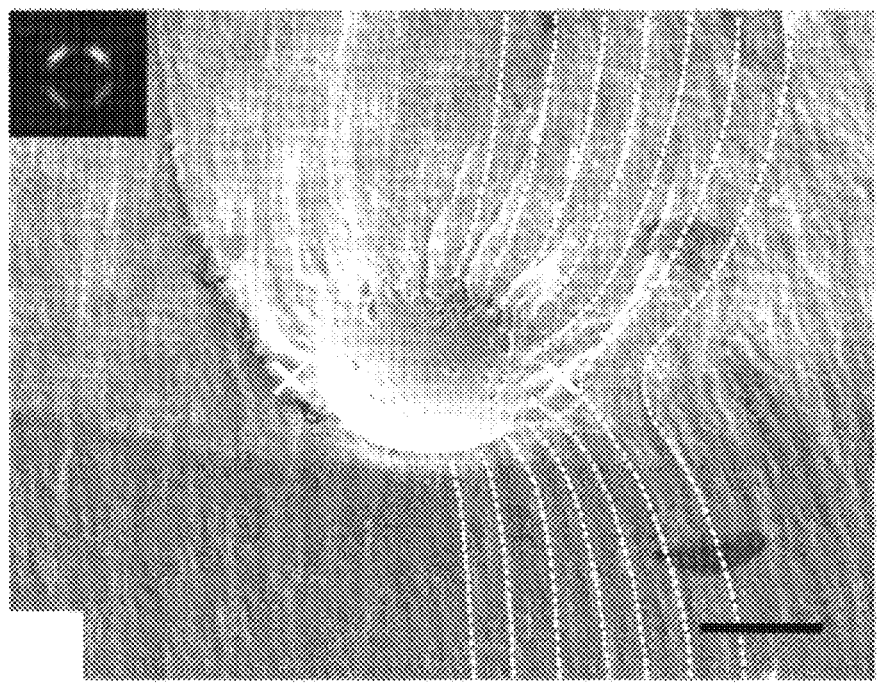

Armed with this study of the local director field of LCs on patterned surfaces, more complex director field structures were investigated, including point defects and line defects created by colloids with homeotropic anchoring suspended in NLC. POM images in FIGS. 4A-4B depict typical pictures of hedgehog and Saturn ring defects surrounding silica colloids. Though numerous studies have focused on these defects in LC systems with a variety of colloidal size, geometry, and topology, direct visualization of the director structure is difficult, as is measuring the precise position of the induced topological defects. With fracture and SEM, here, these features could be determined with 100 nm accuracy. Consider, for example, the hyperbolic hedgehog in FIG. 4A; the defect can be seen as clearly located 2 µm above the colloid. In the same sample, Saturn ring line defects around other silica colloids were seen—FIG. 4B shows a typical defect with a slightly tilted director field. This slight tilting (tilting angle<15°) could not be detected by POM (FIG. 4B inset); however, it can be easily read off from SEM.

This technique can be used to study the nematic textures in ever more complex LC systems. For instance, FIGS. 5A-5E show an LC cell treated for homeotropic alignment which POM was expected to image as black. Instead, the appearance of blue regions was observed, suggesting planar alignment, that are separated from the dark regions by disclination lines. Though such disclination lines are metastable in a neat NLC and relax very quickly, they can have much longer lifetimes when they are stabilized by colloids that are trapped at the disclinations. To observe the structures in FIGS. 5B-5E with SEM, the sample was cooled down and then crosslinked the LCM_X1. In FIG. 5 B a disclination line generated at the boundary of the homeotropic and planar regions is shown. The disclination line can be identified by the fracture structure below and above the fracture plane in SEM as shown in FIG. 5B because of the different mechanical properties of the defect. Similar line defects can also be found in FIGS. 5C and 11, where silica colloids are trapped at the boundary. From the SEM images, the merging of the line defect in the bulk of LC and the Saturn ring surrounding the colloid was observed. Further, it should be noted that bulk disclinations can also be stabilized by pinning to boundaries of the LC cell, as illustrated in FIG. 5D. The bending of the director field can be observed with such clarity that in future work we plan to use this data to study the bending energy of LCs along the defect line as we move from the bulk towards the boundary. FIG. 5E shows the LC orientation inside a planar-like region stabilized by silica colloids. The "escape" configuration was surprising since it required a large bending of the director field from the homeotropic boundaries to the center of the LC cell, resulting in a high elastic energy in the bulk of this 2D LC thin film (~8 µm). A clarifying example of this behavior can be found in the SI, where we show a SEM image of a small "escape" region whose boundaries could be both visualized in the same picture (FIGS. 12A-12C). The SEM images provide a detailed director configuration in this small region, where the planar region starts at the surface of a colloid with an associated defect with topological charge −1, escapes in the direction determined by the defect structure around the colloid and finally ends at another colloid surface. These SEM studies thus provide the capability to fully explore LC anchoring behaviors inside LC cells featuring complex topology and also to "lock" and observe metastable states.

The design and synthesis of a new LCM system with strong dipole-dipole interactions, results in a stable nematic phase and in precise control of molecular anchoring and alignment on different boundary conditions. The director field can be faithfully "locked" by photo-cross-linking, allowing for direct mapping of the LC director field and defect structures by SEM. In turn, the extrapolation length can be calculated and the elastic and anchoring constants of LCs can be cancelled (FIGS. 17 and 18). This molecular design strategy can be extended to other substituents (e.g. to induce hydrogen bonding) and bridging groups that connect the mesogen and epoxy group, such a described herein, in order to fine-tune the mesomorphic properties. Moreover, the LC monomer (LCM_X1) can be produced at a cost of roughly 10% of that of 5CB, but with equal flexibility to be aligned on various boundary conditions. Photopolymerization through epoxy groups is highly efficient and does not alter the LC orientational order. This newfound ability to directly map and measure director fields of short-molecule nematics provides new data to enhance understanding of anchoring, defects, and elasticity that will enable the further control of bulk structures via nanoscale patterning of the substrate and surface chemistry. Further directions include direct photopatterning of a 2D sheet of NLC elastomer or glass with embedded defects and elasticity, followed by actuation by heat or light, providing important new tools for directional folding and actuation of soft matter.

The following references may be useful in understanding some elements of the present invention or background principles thereof.
1. Higgins, D. A. & Luther, B. J. Watching molecules reorient in liquid crystal droplets with multiphoton-excited fluorescence microscopy. J. Chem. Phys. 119, 3935 (2003).

2. Kachynski, A. V., Kuzmin, A. N., Prasad, P. N. & Smalyukh, I. I. Coherent anti-Stokes Raman scattering polarized microscopy of three-dimensional director structures in liquid crystals. Appl. Phys. Lett. 91, 151905 (2007).
3. Smalyukh, I. I., Shiyanovskii, S. V. & Lavrentovich, O. D. Three-dimensional imaging of orientational order by fluorescence confocal polarizing microscopy. Chem. Phys. Lett. 336, 88 (2001).
4. Feller, M. B., Chen, W. & Shen, Y. R. Investigation of surface-induced alignment of liquid-crystal molecules by optical second-harmonic generation. Phys. Rev. A 43, 6778 (1991).
5. Yelin, D., Silberberg, Y., Barad, Y. & Patel, J. S. Phase-Matched Third-Harmonic Generation in a Nematic Liquid Crystal Cell. Phys. Rev. Lett. 82, 3046 (1999).
6. Yoon, D. K. et al. Internal structure visualization and lithographic use of periodic toroidal holes in liquid crystals. Nat. Mater. 6, 5 (2007).
7. Zhang, C. et al. Direct observation of smectic layers in thermotropic liquid crystals. Phys. Rev. Lett. 109 (2012).
8. Gao, M. et al. Direct observation of liquid crystals using cryo-TEM: specimen preparation and low-dose imaging. Microscopy Res. and Technique 77, 19 (2014).
9. Livolant, F. & Bouligand, Y. Freeze-fractures in cholesteric mesophases of polymers. Mol. Cryst. Liq. Cryst. 166, 10 (1989).
10. Bouligand, Y. Twisted fibrous arrangements in biological materials and cholesteric mesophases Tissue & Cell 4, 29 (1972).
11. Donald, A. M., Viney, C. & Windle, A. H. Banded structures in oriented thermotropic polymers. Polymer 24, 155 (1983).
12. Mitchell, G. R. & Windle, A. H. Structural analysis of an oriented liquid crystalline copolyester. Polymer 23, 1269 (1982).
13. Dierking, I. Recent developments in polymer stabilised liquid crystals. Polym. Chem. 1, 1153 (2010).
14. Dierking, I. & Archer, P. Imaging liquid crystal defects. RSC Adv. 3, 5 (2013).
15. Ohm, C., Brehmer, M. & Zentel, R. Liquid Crystalline Elastomers as Actuators and Sensors. Adv. Mater. 22, 3366 (2010).
16. Broer, D. J., Bastiaansen, C. M. W., Debije, M. G. & Schenning, A. P. H. J. Functional Organic Materials Based on Polymerized Liquid-Crystal Monomers: Supramolecular Hydrogen-Bonded Systems. Angew. Chem. Int. Ed. 51, 7102 (2012).
17. Kilpfer, J. & Finkelmann, H. Nematic liquid single crystal elastomers. Makromol. Chem. Rapid Comm. 12, 717 (1991).
18. Thomsen, D. L. et al. Liquid Crystal Elastomers with Mechanical Properties of a Muscle. Macromolecules 34, 5868 (2001).
19. Yu, Y., Nakano, M. & Ikeda, T. Photomechanics: Directed bending of a polymer film by light. Nature 425, 145 (2003).
20. Warner, M. & Terentjev, E. M. Liquid Crystal Elastomers. (Clarendon Press, 2003).
21. Petrov, V. F. & Shimizu, Y. Nitro substitution in achiral calamitic liquid crystals. Liquid Crystals 28, 1627 (2001).
22. Dewar, M. J. S. & Goldberg, R. S. Effects of central and terminal groups on nematic mesophase stability. J. Org. Chem. 35, 2711 (1970).
23. Lee, J. Y., Jang, J., Hong, S. M., Hwang, S. S. & Kim, K. U. Relationship between the structure of the bridging group and curing of liquid crystalline epoxy resins. Polymer 40, 3197 (1999).
24. Minkin, V. I., Osipov, O. A. & Zhdanov, Y. A. Dipole Moments in Organic Chemistry. (Plenum Press, 1970).
25. Broer et al, Cross-Linked Liquid Crystalline Systems: From Rigid Polymer Networks to Elastomers. (CRC Press, 2011).
26. Faetti, S. The effects of curvature on nematic liquid crystals confined in a cylindrical cavity. Phys. Lett. A 237, 264 (1998).
27. Crawford, G. P., Allender, D. W. & Doane, J. W. Surface elastic and molecular anchoring properties of nematic liquid crystals confined to cylindrical cavities. Phys. Rev. A 45, 8693 (1992).
28. Cavallaro, M. et al. Exploiting imperfections in the bulk to direct assembly of surface colloids. Proc. Nat. Acad. Sci. U.S.A 110, 18804 (2013).
29. Shaw, J. M., Gelorme, J. D., LaBianca, N. C., Conley, W. E. & Holmes, S. J. Negative photoresists for optical lithography. IBM J. Res. Dev. 41, 81 (1997).
30. Ito, H. Chemical amplification resists: history and development within IBM. IBM J. Res. Dev. 41, 69 (1997).
31. del Campo, A. & Greiner, C. SU-8: a photoresist for high-aspect-ratio and 3D submicron lithography. J. Micromech. Microeng. 17, R81 (2007).
32. Broer, D. J., Lub, J. & Mol, G. N. Synthesis and photopolymerization of a liquid crystalline diepoxide. Macromolecules 26, 1244 (1993).
33. Jahromi, S., Lub, J. & Mol, G. N. Synthesis and photoinitiated polymerization of liquid crystalline diepoxides. Polymer 35, 622 (1994).
34. van Oosten, C. L., Bastiaansen, C. W. M. & Broer, D. J. Printed artificial cilia from liquid-crystal network actuators modularly driven by light. Nat. Mater. 8, 677 (2009).
35. Hudson, S. D. & Thomas, E. L. Frank Elastic-constant anisotropy measured from transmission electron microscope images of disclinations. Phys. Rev. Lett. 62, 5 (1989).
36. Lapointe, C. P., Mason, T. G. & Smalyukh, I. I. Shape-Controlled Colloidal Interactions in Nematic Liquid Crystals. Science 326, 1083 (2009).
37. Senyuk, B. et al. Topological colloids. Nature 493, 200 (2013).
38. Poulin, P., Stark, H., Lubensky, T. C. & Weitz, D. A. Novel Colloidal Interactions in Anisotropic Fluids. Science 275, 1770 (1997).
39 Muševič, I., Škarabot, M., Tkalec, U., Ravnik, M. & Tumer, S. Two-Dimensional Nematic Colloidal Crystals Self-Assembled by Topological Defects. Science 313, 954 (2006).
40. Zhang, Y., Lo, C.-W., Taylor, J. A. & Yang, S. Replica Molding of High-Aspect-Ratio Polymeric Nanopillar Arrays with High Fidelity. *Langmuir* 22, 8595 (2006).
41. Klaus, J. W. & George, S. M. $SiO_2$ Chemical Vapor Deposition at Room Temperature Using $SiCl_4$ and $H_2O$ with an $NH_3$ Catalyst. *J. Electrochem. Soc.* 147, 2658 (2000).
42. Crawford, G. P., Allender, D. W. & Doane, J. W. Surface elastic and molecular anchoring properties of nematic liquid crystals confined to cylindrical cavities. *Phys. Rev. A* 45, 8693 (1992).
43. Yoon D K, et al., Internal structure visualization and lithographic use of periodic toroidal holes in liquid crystals. Nat. Mater. 6, 11, 866-870 (2007).

44. Zhang C, et al., Direct observation of smectic layers in thermotropic liquid crystals. Phys. Rev. Lett. 109, 10, 107802 (2012).
45. Bishop, D. J., Gammel P. L., Huse D. A., & Murray C. A. Magnetic flux-line lattices and vortices in the copper oxide superconductors. Science 255, 5041, 165-172 (1992).
46. Tchernyshyov O., Chern G-W. Fractional vortices and composite domain walls in flat nanomagnets. Phys. Rev. Lett., 95, 19, 197204 (2005).
47. Kibble T. W. B., Topology of cosmic domains and strings. J. Phys. Math. Gen. 9, 8, 1387 (1976).
48. Nikkhou M., et al. Light-controlled topological charge in a nematic liquid crystal. Nat. Phys. 11, 2, 183-187 (2015).
49. Modes C. D., Bhattacharya K., Warner M. Disclination-mediated thermo-optical response in nematic glass sheets. Phys. Rev. E Stat. Nonlin. Soft Matter Phys. 81, 6 Pt 1, 060701 (2010).
50. Ware T. H., McConney M. E., Wie J. J., Tondiglia V. P., White T. J. Actuating materials. Voxelated liquid crystal elastomers. Science, 347, 6225, 982-984 (2015).
52. Zuev V. V., de Vekki D. A., Catalytic isomerization of terminal olefins in liquid crystalline polyesters at hydrosilylation with 1-(1'-arylethoxy)-1,1,3,3-tetramethyldisiloxanes. Russ. J. Org. Chem., 42, 8, 1105-1112 (2006).
53. Berreman D. W., Meiboom S., Zasadzinski J. A., Sammon M. J. Theory and simulation of freeze-fracture in cholesteric liquid crystals. Phys. Rev. Lett., 57, 14, 1737-1740 (1986).
54. Zasadzinski J. A., Bailey S. M. Applications of freeze-fracture replication to problems in materials and colloid science. J. Electron Microsc. Tech., 13, 4, 309-334 (1989).
55. Warenghem M., A test for surface energy anisotropy sign determination. Mol. Cryst. Liq. Cryst., 89, 1-4, 15-21 (1982).

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed is:

1. A mesogenic compound having a structure of Formula (I):

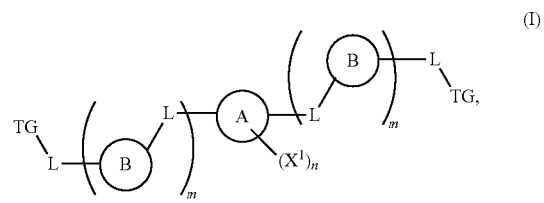

wherein:
A is phenyl and B is pyridinyl or both A and B are pyridinyl;
wherein each L is positioned para to one another on each A or B ring and L is, independently at each occurrence, —CH(C=NOH)—, —C(O)N($R^1$)—, —OC(O)N($R^1$)—, or —N($R^1$)C(O)O—;
$X^1$ is $NO_2$ or CN;
Wherein $R^1$ is independently at each occurrence H or $C_{1-3}$alkyl;
Each TG independently comprises an epoxy, glycidyl, acrylate, methacrylate, alkene, alkyne, or oxetane; m is independently 1, 2, or 3 at each occurrence; and
n is 1, 2, or 3.

2. The mesogenic compound of claim 1, wherein:
A is phenyl and B is pyridinyl.

3. The mesogenic compound of claim 1, wherein A is pyridinyl and the relative positions of $X^1$ with respect to ring A are:

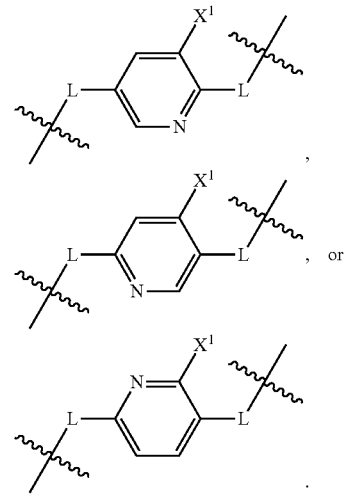

4. The mesogenic compound of claim 1, wherein n is 1 and $X^1$ is $NO_2$.
5. The mesogenic compound of claim 1, wherein TG independently comprises an epoxy, alkene, or glycidyl.
6. The mesogenic compound of claim 1, wherein TG is the same epoxy or glycidyl in both occurrences.
7. The mesogenic compound of claim 1, wherein m is 1 or 2 and the same at each occurrence.
8. The mesogenic compound of claim 1, wherein m is 1.
9. The mesogenic compound of claim 1, wherein A and B are pyridinyl.

10. A composition comprising the mesogenic compound of claim 1 and a crosslinking agent or at least one nanodimensioned dopant, or both a crosslinking agent and at least one nanodimensioned dopant.

11. An article comprising the composition of claim 10 superposed on a nano and micro-dimensionally patterned substrate.

12. A liquid crystal composition or polymer precursor comprising a crosslinkable mesogenic compound of claim 1, wherein the liquid crystal composition or polymer precursor:
   (a) is crosslinked with at least one crosslinking agent; or
   (b) further comprises a nanodimensioned dopant; or
   (c) is a nematic liquid crystal; or
   (d) is a combination of two or more of (a), (b), and (c).

13. An optical film, coating, or encapsulant comprising a liquid crystal composition or polymer precursor of claim 12 that exhibits high positive birefringence.

14. An optical waveguide comprising a liquid crystal composition or polymer precursor of claim 12.

15. An actuator, sensor, artificial muscle, mechanically or thermally tunable laser device, a mechanically or thermally tunable temperature sensor, an optical polarizer, cosmetic pigment, photovoltaic substrate, or fuel cell membrane comprising a polymer precursor comprising a crosslinkable mesogenic compound of claim 1 and an optional chiral dopant.

16. A method of estimating the elastic constant of a liquid crystal material comprising: incorporating a mesogenic compound of claim 1 into a matrix of polymerized liquid crystal material and imaging the matrix using scanning electron microscopy.

17. A method of mapping defect structures in liquid crystals comprising: incorporating a mesogenic compound of claim 1 into a polymerized matrix of the liquid crystal, the method further comprising imaging the defect structures or orientation/alignment of the liquid crystals or LC molecules through the defect fractures of the polymerized liquid crystal matrix using scanning electron microscopy.

18. A mesogenic compound having a structure of Formula (I):

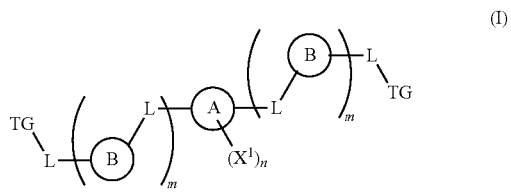

wherein:
A and B are pyridinyl;
wherein each L is positioned para to one another on each A or B ring and L is, independently at each occurrence, —CH(C=NOH)—, —C(O)N($R^1$), —OC(O)N($R^1$)—, or —N($R^1$)C(O)O—;
$X^1$ is CN;
wherein $R^1$ is independently at each occurrence H or $C_{1-3}$alkyl;
Each TG independently comprises an epoxy, glycidyl, acrylate, methacrylate, alkene, alkyne, or oxetane;
m is independently 1, 2, or 3 at each occurrence; and
n is 1, 2, or 3.

* * * * *

UNITED STATES PATENT AND TRADEMARK OFFICE
CERTIFICATE OF CORRECTION

PATENT NO. : 11,680,207 B2
APPLICATION NO. : 15/553820
DATED : June 20, 2023
INVENTOR(S) : Shu Yang et al.

It is certified that error appears in the above-identified patent and that said Letters Patent is hereby corrected as shown below:

In the Specification

Under Column No. 1, Line No. 21, Replace:
"DMR12-62047 awarded"
With:
--DMR 12-62047 awarded--

Under Column No. 3, Line No. 49, Replace:
"(tan 6) and"
With:
--(tan δ) and--

Under Column No. 5, Line No. 62, Replace:
"20 in."
With:
--20 μm.--

Under Column No. 5, Line No. 64, Replace:
"20 m,"
With:
--20 μm,--

Under Column No. 13, Lines No. 5-6, Replace:
"(DIAS), ($h^5$-2,4-cyclopentadiene-1-yl)[1,2,3,4,5,6-q](1-(methylethyl)benzene)iron(I)"
With:
--(DIAS), ($η^5$-2,4-cyclopentadiene-1-yl)[1,2,3,4,5,6-η](1-(methylethyl)benzene)iron(I)--

Under Column No. 13, Line No. 19, Replace:
"(Merck), CB 15"

Signed and Sealed this
Fourteenth Day of November, 2023

Katherine Kelly Vidal
*Director of the United States Patent and Trademark Office*

CERTIFICATE OF CORRECTION (continued)
U.S. Pat. No. 11,680,207 B2

With:
--(Merck), CB15--

Under Column No. 15, Line No. 46, Replace:
"(tan 6)"
With:
--(tan δ)--

Under Column No. 21, Line No. 44, Replace:
"(-)-glycidol were"
With:
--(±)-glycidol were--

Under Column No. 22, Line No. 33, Replace:
"DMSO-d6): d(ppm)="
With:
--DMSO-d6): δ(ppm)=--

Under Column No. 22, Line No. 53, Replace:
"1.3 g (-)-glycidol"
With:
--1.3 g (±)-glycidol--

Under Column No. 22, Line No. 66, Replace:
"d(ppm)=2.75"
With:
--δ(ppm)=2.75--

Under Column No. 23, Line No. 23, Replace:
"d(ppm)=4.87"
With:
--δ(ppm)=4.87--

Under Column No. 23, Line No. 45, Replace:
"d(ppm)=2.75"
With:
--δ(ppm)=2.75--

Under Column No. 23, Lines No. 50-51, Replace:
"1H, -(O)COCH_CHCH2),"
With:
--1H, -(O)COCH2_CHCH2),--

Under Column No. 25, Line No. 37, Replace:
"$n_e$~1.67-0.02 and"

CERTIFICATE OF CORRECTION (continued)
U.S. Pat. No. 11,680,207 B2

With:
--$n_e$~1.67±0.02 and--

Under Column No. 25, Line No. 38, Replace:
"$n_o$~1.5-0.02 of"
With:
--$n_o$~1.5±0.02 of--

Under Column No. 25, Line No. 43, Replace:
"as 0.16-n=0.02,"
With:
--as 0.16±n=0.02,--

Under Column No. 25, Line No. 61, Replace:
"q(r)=2 tan$^{-1}$(ar/R$_0$)"
With:
--$\theta(r)=2\tan^{-1}(\alpha r/R_0)$--

Under Column No. 25, Line No. 66, Replace:
"a is"
With:
--$\alpha$ is--

Under Column No. 26, Line No. 20, Replace:
"angle j$_h$"
With:
--angle $\varphi h$--

Under Column No. 26, Line No. 21, Replace:
"j$_h$=sin-1"
With:
--$\varphi_h$=sin-1--

Under Column No. 26, Line No. 26, Replace:
"length x$_h$=K/W$_h$=1.3μ"
With:
--length $\xi_h$=K/W$_h$=1.3μ--

Under Column No. 26, Lines No. 35-36, Replace:

$$2x_h(j_p - j_h) = d\sin(2(P_h - j_h))$$

"$2x_p(j_p - j_h) = d\sin(2(P_p - j_p))$,"

CERTIFICATE OF CORRECTION (continued)
U.S. Pat. No. 11,680,207 B2

With:

$$2\xi_h(\varphi_p - \varphi_h) = d\sin(2(\Phi_h - \varphi_h))$$
$$2\xi_p(\varphi_p - \varphi_h) = d\sin(2(\Phi_p - \varphi_p))$$

Under Column No. 26, Line No. 39, Replace:
"thickness, x"
With:
--thickness, $\xi$--

Under Column No. 26, Line No. 40, Replace:
"F the"
With:
--$\Phi$ the--

Under Column No. 26, Line No. 41, Replace:
"Fh is"
With:
--$\Phi$h is--

Under Column No. 26, Line No. 41, Replace:
"and Fp"
With:
--and $\Phi$p--

Under Column No. 26, Line No. 42, Replace:
"p/2), j is"
With:
--π/2), $\Phi$ is--

Under Column No. 26, Line No. 46, Replace:
"xh could"
With:
--$\xi$h could--

Under Column No. 26, Line No. 48, Replace:
"anchoring, xp."
With:
--anchoring, $\xi$p.--

Under Column No. 27, Line No. 3, Replace:
"$W_h=2.6*10^{12}$"
With:
--$W_h=2.6*10^{-12}$--

CERTIFICATE OF CORRECTION (continued)
U.S. Pat. No. 11,680,207 B2

Under Column No. 27, Line No. 55, Replace:
"(=4.01 D)"
With:
--($\mu$=4.01 D)--

Under Column No. 28, Line No. 34, Replace:
"(-1, where"
With:
--($\pm$1, where--

Under Column No. 29, Line No. 49, Replace:
"2 µm"
With:
--2 pm--

In the Claims

Under Column No. 36, in Claim 17, Line No. 1, Replace:
"I into"
With:
--1 into--